United States Patent [19]

Poland et al.

[11] Patent Number: 5,673,407
[45] Date of Patent: Sep. 30, 1997

[54] DATA PROCESSOR HAVING CAPABILITY TO PERFORM BOTH FLOATING POINT OPERATIONS AND MEMORY ACCESS IN RESPONSE TO A SINGLE INSTRUCTION

[75] Inventors: Sydney W. Poland, Katy; Christopher J. Read, Houston; Karl M. Guttag, Sugar Land; Robert J. Gove; Michael Gill, both of Plano, all of Tex.; Nicholas Ing Simmons, Huntingdon, England; Erick Oakland, Zavalla; Jeremiah E. Golston, Sugar Land, both of Tex.

[73] Assignee: Texas Instruments Incorporated, Dallas, Tex.

[21] Appl. No.: 207,987

[22] Filed: Mar. 8, 1994

[51] Int. Cl.⁶ ..................... G06F 9/30
[52] U.S. Cl. ........... 395/375; 395/800; 364/DIG. 1; 364/DIG. 2
[58] Field of Search ............ 395/375, 800, 395/650, 700, 563

[56] References Cited

U.S. PATENT DOCUMENTS

| | | | |
|---|---|---|---|
| 4,511,990 | 4/1985 | Hagiwara et al. | 364/748 |
| 4,538,239 | 8/1985 | Mager | 364/759 |
| 4,646,257 | 2/1987 | Essig | 364/760 |
| 4,665,500 | 5/1987 | Poland | 364/760 |
| 4,821,187 | 4/1989 | Ueda et al. | 364/200 |
| 5,010,508 | 4/1991 | Sit et al. | 364/748 |
| 5,027,308 | 6/1991 | Sit et al. | 364/748 |
| 5,150,469 | 9/1992 | Jouppi | 395/375 |
| 5,170,370 | 12/1992 | Lee et al. | 364/736 |
| 5,185,714 | 2/1993 | Nakayama | 364/750.5 |
| 5,197,140 | 3/1993 | Balmer | 395/400 |
| 5,212,777 | 5/1993 | Gove et al. | 395/375 |
| 5,226,125 | 7/1993 | Balmer et al. | 395/325 |
| 5,235,533 | 8/1993 | Sweedler | 364/715.03 |
| 5,239,654 | 8/1993 | Ing-Simmons et al. | 395/800 |
| 5,241,490 | 8/1993 | Poon | 364/715.04 |
| 5,241,636 | 8/1993 | Kohn | 395/375 |
| 5,258,943 | 11/1993 | Gamez et al. | 364/745 |
| 5,430,851 | 7/1995 | Hirata et al. | 395/375 |
| 5,430,884 | 7/1995 | Beard et al. | 395/800 |
| 5,488,729 | 1/1996 | Vegesna et al. | 395/800 |

FOREIGN PATENT DOCUMENTS

| | | |
|---|---|---|
| 2228116 | 8/1990 | United Kingdom . |
| 2228652 | 10/1993 | United Kingdom . |

OTHER PUBLICATIONS

The TI Advanced Scientific computer by Cragon et al., Jan. 1989 IEEE publication, pp. 55–64. Jan. 1989.
A single chip multimedia video processor by Blamer et al., 1994 IEEE publication, pp. 91–94.
Mediastation 5000: Integrating video and audio by Lee et al., 1994 IEEE publication, pp. 50–61.
An integrated floating point vector processor for DSP and scientific computing by Kumar et al., IEEE publication, pp. 8–13. 1989.
Operational experiences with the TI Advanced scientific computer by Carr et al., pp. 389–397. 1974.
Microprocessor Report, Slater, Michael, "IIT Ships Programmable Video Processor," vol. 5, No. 20, Oct. 30, 1991 pp. 1, 6–7, 13.

*Primary Examiner*—William M. Treat
*Assistant Examiner*—Zarni Maung
*Attorney, Agent, or Firm*—Robert D. Marshall, Jr.; James C. Kesterson; Richard L. Donaldson

[57] ABSTRACT

A data processor includes both integer and floating point operation units and operates as a reduced instruction set computer (RISC). A modification of the normal load/store RISC operations includes within in its instruction set some instructions that permit floating point operations to be paired with load or store operations. These operations include: vector floating point add; vector multiply accumulate; vector floating point multiply; vector multiply subtract; vector reverse subtract; vector round floating point input; vector round integer input; and vector floating point subtract.

46 Claims, 15 Drawing Sheets

32-BIT REGISTERS

64-BIT REGISTER PAIRS
(ALWAYS ADDRESSED USING
AN EVEN REGISTER NUMBER)

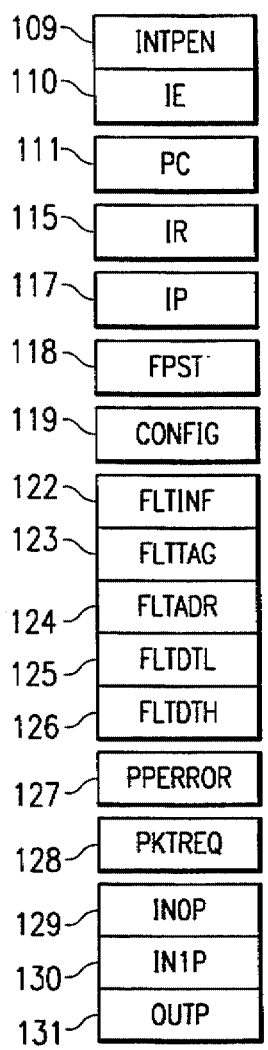
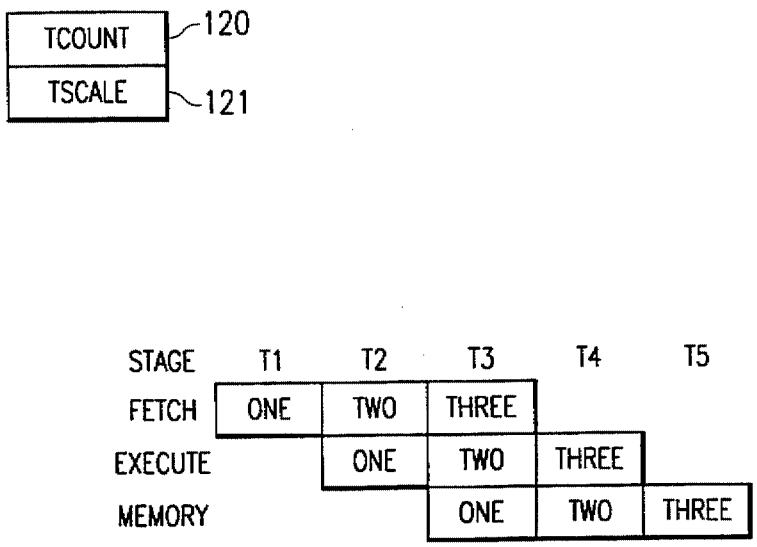
FIG. 7
FIG. 8
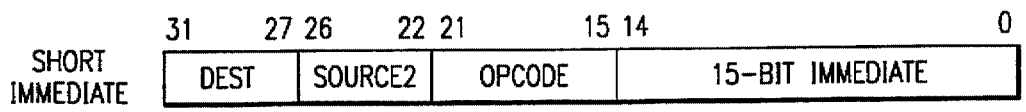
FIG. 9a
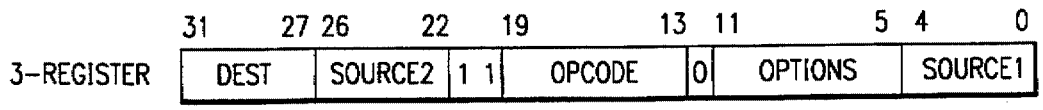
FIG. 9b
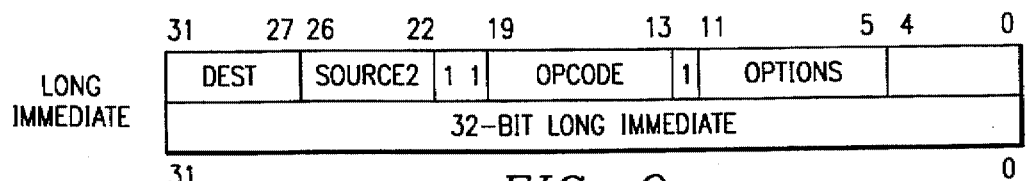
FIG. 9c

VECTOR FLOATING POINT ADD

```
           31    27       22              13         5      0
REGISTER  |X X X X X| DEST |1 1 1 1 0 1 0 0 0|0|a|X X|D|X|S| SOURCE |

LONG      |X X X X X| DEST |1 1 1 1 0 1 0 0 0|1|a|X X|D|X|S| SOURCE |
IMMEDIATE |                     IMMEDIATE                          |
```

X = USED TO CODE VECTOR LOAD OR STORE
S = PRECISION OF SOURCE1              0 = SINGLE, 1 = DOUBLE PRECISION
a = RESERVED FOR ACCUMULATOR SELECT
D = PRECISION OF DEST                 0 = SINGLE, 1 = DOUBLE PRECISION

*FIG. 17*

VECTOR MULTIPLY ACCUMULATE

```
          31    27       22              13         5      0
REG ACC  |X X X X X|SOURCE2|1 1 1 0 1 1 1 0|0|a|X X|Z|S|X|S| SOURCE1 |

REG REG  |  DEST   |SOURCE2|1 1 1 0 1 1 1 0|0|a|0|D|Z|S|0|S| SOURCE1 |

IMM ACC  |X X X X X|SOURCE2|1 1 1 0 1 1 1 0|1|a|X X|Z|S|X|S|         |
         |                     IMMEDIATE                            |

IMM REG  |  DEST   |SOURCE2|1 1 1 0 1 1 1 0|1|a|0|D|Z|S|0|S|         |
         |                     IMMEDIATE                            |
```

X = USED TO CODE VECTOR LOAD OR STORE
S = RESERVED FOR PRECISION OF SOURCES   0 = SINGLE, 1 = DOUBLE PRECISION
a = ACCUMULATOR SELECT
D = PRECISION OF DEST                   0 = SINGLE, 1 = DOUBLE PRECISION
Z = ADD TO ZERO RATHER THAN ACCUMULATOR

*FIG. 18*

VECTOR FLOATING POINT MULTIPLY

```
           31    27       22              13         5      0
REGISTER  |X X X X X| DEST |1 1 1 1 0 1 0 1 0|0|a|X X|D|X|S| SOURCE |

LONG      |X X X X X| DEST |1 1 1 1 0 1 0 1 0|1|a|X X|D|X|S|        |
IMMEDIATE |                     IMMEDIATE                          |
```

X = USED TO CODE VECTOR LOAD OR STORE
S = PRECISION OF SOURCE1              0 = SINGLE, 1 = DOUBLE PRECISION
a = RESERVED FOR ACCUMULATOR SELECT
D = PRECISION OF DEST                 0 = SINGLE, 1 = DOUBLE PRECISION

*FIG. 19*

VECTOR MULTIPLY SUBTRACT

```
              31    27        22                    13            5        0
REG ACC      |X X X X X| SOURCE2 |1 1 1 1 0 1 1 1 1|0|a|X X|Z|S|X|S| SOURCE1 |

REG REG      |  DEST   | SOURCE2 |1 1 1 1 0 1 1 1 1|0|a|O|D|Z|S|O|S| SOURCE1 |

IMM ACC      |X X X X X| SOURCE2 |1 1 1 1 0 1 1 1 1|1|a|X X|Z|S|X|S|
             |                    IMMEDIATE                                  |

IMM REG      |  DEST   | SOURCE2 |1 1 1 1 0 1 1 1 1|1|a|O|D|Z|S|O|S|
             |                    IMMEDIATE                                  |
```

X = USED TO CODE VECTOR LOAD OR STORE
S = RESERVED FOR PRECISION OF SOURCES    0 = SINGLE, 1 = DOUBLE PRECISION
a = ACCUMULATOR SELECT
D = PRECISION OF DEST                    0 = SINGLE, 1 = DOUBLE PRECISION
Z = SUBTRACT FROM ZERO RATHER THAN ACCUMULATOR

FIG. 20

VECTOR REVERSE SUBTRACT

```
                  31    27        22                    13            5        0
REGISTER         |X X X X X|  DEST  |1 1 1 1 0 1 0 1 1|0|a|X X|Z|D|X|S| SOURCE |

LONG
IMMEDIATE        |X X X X X|  DEST  |1 1 1 1 0 1 0 1 1|1|a|X X|Z|D|X|S|
                 |                    IMMEDIATE                              |
```

X = USED TO CODE VECTOR LOAD OR STORE
S = RESERVED FOR PRECISION OF SOURCE1    0 = SINGLE, 1 = DOUBLE PRECISION
a = ACCUMULATOR SELECT
D = PRECISION OF DEST                    0 = SINGLE, 1 = DOUBLE PRECISION
Z = ADD TO ZERO RATHER THAN ACCUMULATOR

FIG. 21

VECTOR ROUND-FLOATING POINT INPUT

| | 31 | 27 | 22 | | 13 | | 5 | 0 |
|---|---|---|---|---|---|---|---|---|
| REGISTER | X X X X X | DEST | 1 1 1 1 0 1 1 0 0 | 0 a X X | P D X S | SOURCE | | |
| LONG IMMEDIATE | X X X X X | DEST | 1 1 1 1 0 1 1 0 0 | 1 a X X | P D X S | | | |
| | IMMEDIATE | | | | | | | |

X = USED TO CODE VECTOR LOAD OR STORE
S = PRECISION OF SOURCE1       0 = SINGLE, 1 = DOUBLE PRECISION
a = ACCUMULATOR SELECT
PD = PRECISION OF DEST         00 SINGLE PRECISION      (SP)
                               01 DOUBLE PRECISION      (DP)
                               10 32 BIT SIGNED INTEGER (I)
                               11 32 BIT UNSIGNED INTEGER (U)

FIG. 22

VECTOR ROUND-INTEGER INPUT

| | 31 | 27 | 22 | | 13 | | 5 | 0 |
|---|---|---|---|---|---|---|---|---|
| REGISTER | X X X X X | DEST | 1 1 1 1 0 1 1 0 1 | 0 a X X | D X S | SOURCE | | |
| LONG IMMEDIATE | X X X X X | DEST | 1 1 1 1 0 1 1 0 1 | 1 a X X | D X S | | | |
| | IMMEDIATE | | | | | | | |

X = USED TO CODE VECTOR LOAD OR STORE
S = FORMAT OF SOURCE1          0 = SIGNED, 1 = UNSIGNED
a = ACCUMULATOR SELECT
D = PRECISION OF DEST          0 = SINGLE, 1 = DOUBLE

FIG. 23

VECTOR FLOATING POINT SUBTRACT

| | 31 | 27 | 22 | | 13 | | 5 | 0 |
|---|---|---|---|---|---|---|---|---|
| REGISTER | X X X X X | DEST | 1 1 1 0 1 0 0 1 | 0 a X X | D X S | SOURCE | | |
| LONG IMMEDIATE | X X X X X | DEST | 1 1 1 0 1 0 0 1 | 1 a X X | D X S | | | |
| | IMMEDIATE | | | | | | | |

X = USED TO CODE VECTOR LOAD OR STORE
S = PRECISION OF SOURCE1            0 = SINGLE, 1 = DOUBLE PRECISION
a = RESERVED FOR ACCUMULATOR SELECT
D = PRECISION OF DEST               0 = SINGLE, 1 = DOUBLE PRECISION

FIG. 24

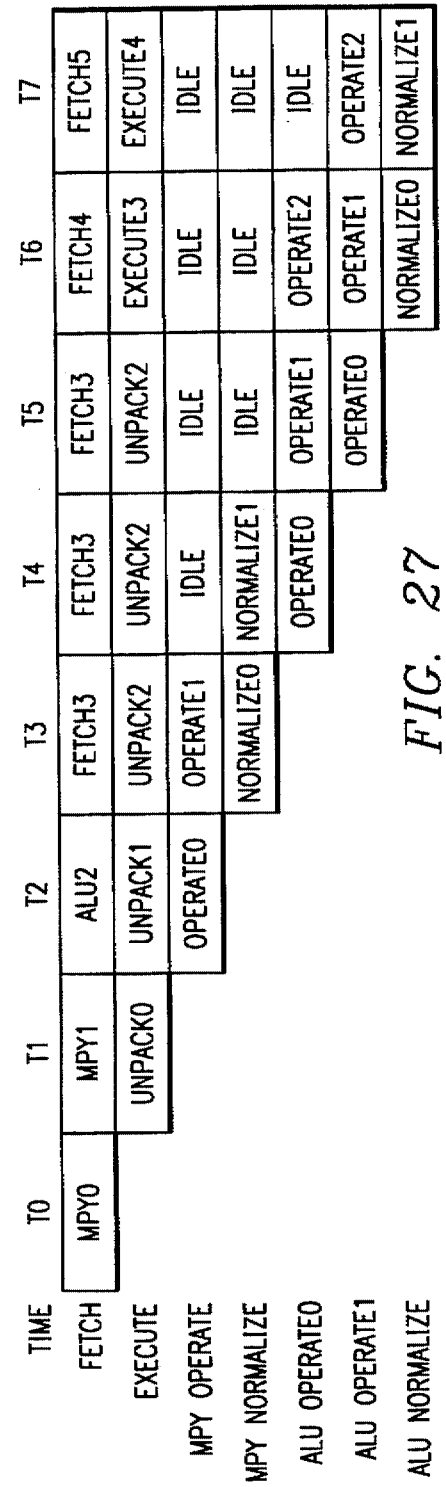

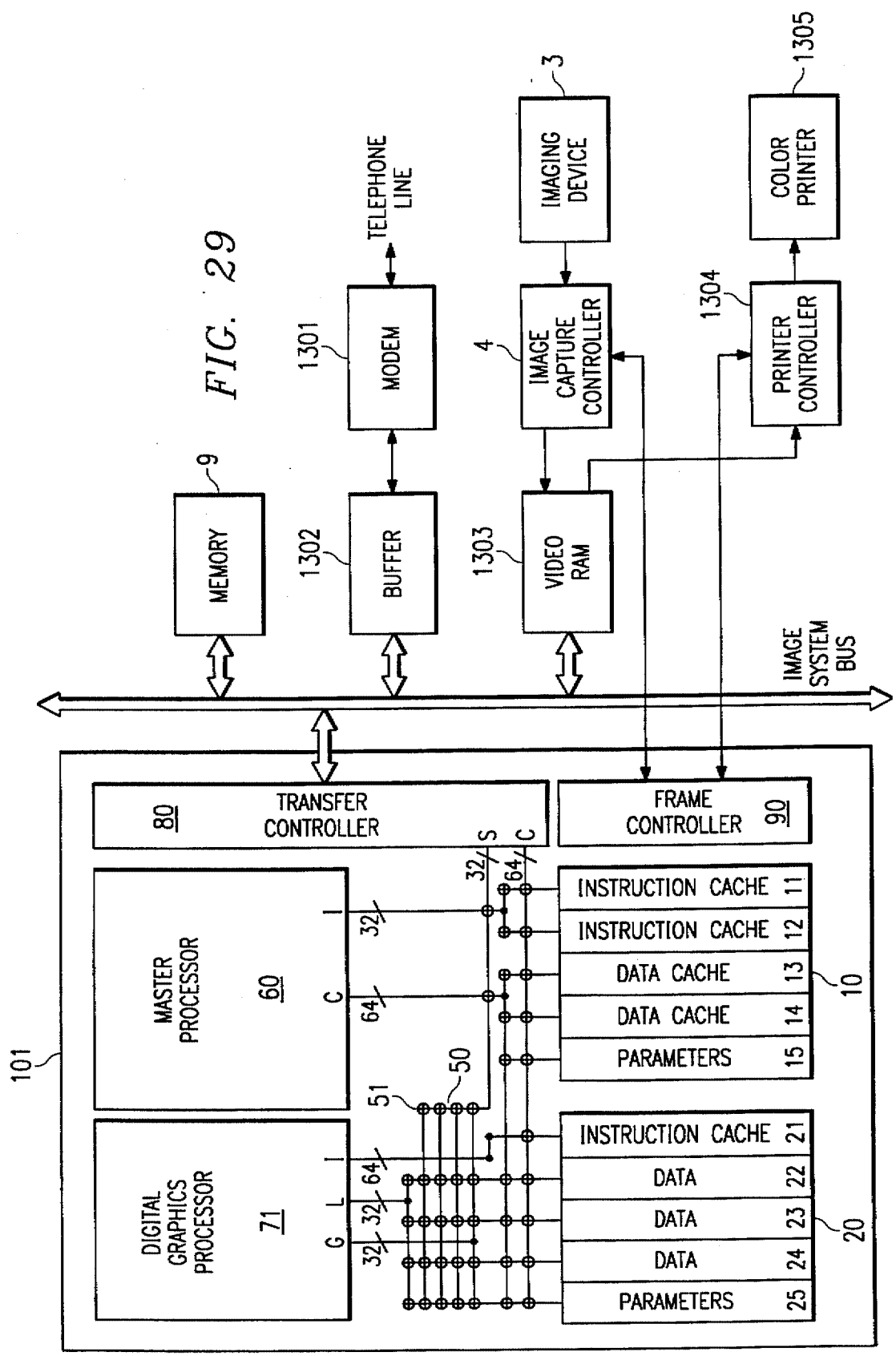

DATA PROCESSOR HAVING CAPABILITY TO PERFORM BOTH FLOATING POINT OPERATIONS AND MEMORY ACCESS IN RESPONSE TO A SINGLE INSTRUCTION

CROSS REFERENCE TO RELATED APPLICATIONS

This application relates to improvements in the inventions disclosed in the following patents and copending U.S. patent applications, all of which are assigned to Texas Instruments and all of which are incorporated by reference:

U.S. Pat. No. 5,471,592 issued Nov. 28, 1995 entitled "MULTI-PROCESSOR WITH CROSSBAR LINK OF PROCESSORS AND MEMORIES AND METHOD OF OPERATION";

U.S. Pat. No. 5,212,777, issued May 18, 1993, filed Nov. 17, 1989 and entitled "SIMD/MIMD RECONFIGURABLE MULTI-PROCESSOR AND METHOD OF OPERATION";

U.S. Pat. No. 5,522,083 issued May 28, 1996 entitled "RECONFIGURABLE COMMUNICATIONS FOR MULTI-PROCESSOR AND METHOD OF OPERATION,"

U.S. patent application Ser. No. 08/264,582 filed Jun. 22, 1994 entitled "REDUCED AREA OF CROSSBAR AND METHOD OF OPERATION", a continuation of U.S. patent application Ser. No. 07/437,852 filed Nov. 17, 1989 and now abandoned;

U.S. patent application Ser. No. 08/032,530 filed Mar. 15, 1993 entitled "SYNCHRONIZED MIMD MULTI-PROCESSING SYSTEM AND METHOD OF OPERATION," a continuation of U.S. patent application Ser. No. 07/437,853 filed Nov. 17, 1989 and now abandoned;

U.S. Pat. No. 5,197,140 issued Mar. 23, 1993 filed Nov. 17, 1989 and entitled "SLICED ADDRESSING MULTI-PROCESSOR AND METHOD OF OPERATION";

U.S. Pat. No. 5,339,447 issued Aug. 16, 1994 entitled "ONES COUNTING CIRCUIT, UTILIZING A MATRIX OF INTERCONNECTED HALF-ADDERS, FOR COUNTING THE NUMBER OF ONES IN A BINARY STRING OF IMAGE DATA".

U.S. Pat. No. 5,239,654 issued Aug. 24, 1993 filed Nov. 17, 1989 and entitled "DUAL MODE SIMD/MIMD PROCESSOR PROVIDING REUSE OF MIMD INSTRUCTION MEMORIES AS DATA MEMORIES WHEN OPERATING IN SIMD MODE";

U.S. Pat. No. 5,410,649 issued Apr. 25, 1995 entitled "IMAGING COMPUTER AND METHOD OF OPERATION"

U.S. Pat. No. 5,226,125 issued Jul. 6, 1993 filed Nov. 17, 1989 and entitled "SWITCH MATRIX HAVING INTEGRATED CROSSPOINT LOGIC AND METHOD OF OPERATION".

U.S. patent application Ser. No. 08/160,299 filed Nov. 30, 1993 and entitled "THREE INPUT ARITHMETIC LOGIC UNIT WITH BARREL ROTATOR";

U.S. patent application Ser. No. 08/158,742 filed Nov. 30, 1993 and entitled "ARITHMETIC LOGIC UNIT HAVING PLURAL INDEPENDENT SECTIONS AND REGISTER STORING RESULTANT INDICATOR BIT FROM EVERY SECTION";

U.S. patent application Ser. No. 08/160,118 filed Nov. 30, 1993 "MEMORY STORE FROM A REGISTER PAIR CONDITIONAL";

U.S. Pat. No. 5,442,581 issued Aug. 15, 1995 and entitled "ITERATIVE DIVISION APPARATUS, SYSTEM AND METHOD FORMING PLURAL QUOTIENT BITS PER ITERATION";

U.S. patent application Ser. No. 08/159,285 filed Nov. 30, 1993 and entitled "THREE INPUT ARITHMETIC LOGIC UNIT FORMING MIXED ARITHMETIC AND BOOLEAN COMBINATIONS";

U.S. patent application Ser. No. 08/160,119 filed Nov. 30, 1993 and entitled "METHOD, APPARATUS AND SYSTEM FORMING THE SUM OF DATA IN PLURAL EQUAL SECTIONS OF A SINGLE DATA WORD";

U.S. Pat. No. 5,512,896 issued Apr. 30, 1996 and entitled "HUFFMAN ENCODING METHOD, CIRCUITS AND SYSTEM EMPLOYING MOST SIGNIFICANT BIT CHANGE FOR SIZE DETECTION";

U.S. Pat. No. 5,479,166 issued Dec. 26, 1995 and entitled "HUFFMAN DECODING METHOD, CIRCUIT AND SYSTEM EMPLOYING CONDITIONAL SUBTRACTION FOR CONVERSION OF NEGATIVE NUMBERS";

U.S. patent application Ser. No. 08/160,112 filed Nov. 30, 1993 and entitled "METHOD, APPARATUS AND SYSTEM FOR SUM OF PLURAL ABSOLUTE DIFFERENCES";

U.S. patent application Ser. No. 08/160,120 filed Nov. 30, 1993 and entitled "ITERATIVE DIVISION APPARATUS, SYSTEM AND METHOD EMPLOYING LEFT MOST ONE'S DETECTION AND LEFT MOST ONE'S DETECTION WITH EXCLUSIVE OR";

U.S. patent application Ser. No. 08/160,114 filed Nov. 30, 1993 and entitled "ADDRESS GENERATOR EMPLOYING SELECTIVE MERGE OF TWO INDEPENDENT ADDRESSES";

U.S. Pat. No. 5,420,809 issued May 30, 1995 and entitled "METHOD, APPARATUS AND SYSTEM METHOD FOR CORRELATION";

U.S. Pat. No. 5,509,129 issued Apr. 16, 1996 and entitled "LONG INSTRUCTION WORD CONTROLLING PLURAL INDEPENDENT PROCESSOR OPERATIONS";

U.S. patent application Ser. No. 08/159,346 filed Nov. 30, 1993 and entitled "ROTATION REGISTER FOR ORTHOGONAL DATA TRANSFORMATION";

U.S. patent application Ser. No. 08/159,652 filed Nov. 30, 1993 "MEDIAN FILTER METHOD, CIRCUIT AND SYSTEM";

U.S. patent application Ser. No. 08/159,344 filed Nov. 30, 1993 and entitled "ARITHMETIC LOGIC UNIT WITH CONDITIONAL REGISTER SOURCE SELECTION";

U.S. patent application Ser. No. 08/160,301 filed Nov. 30, 1993 and entitled "APPARATUS, SYSTEM AND METHOD FOR DIVISION BY ITERATION"

U.S. patent application Ser. No. 08/159,650 filed Nov. 30, 1993 and entitled "MULTIPLY ROUNDING USING REDUNDANT CODED MULTIPLY RESULT";

U.S. Pat. No. 5,446,651 issued Aug. 29, 1996 and entitled "SPLIT MULTIPLY OPERATION";

U.S. patent application Ser. No. 08/158,741 filed Nov. 30, 1993 and entitled "MIXED CONDITION TEST CONDITIONAL AND BRANCH OPERATIONS INCLUDING CONDITIONAL TEST FOR ZERO";

U.S. patent application Ser. No. 08/160,302 filed Nov. 30, 1993 and entitled "PACKED WORD PAIR MULTIPLY OPERATION";

U.S. patent application Ser. No. 08/160,573 filed Nov. 30, 1993 and entitled "THREE INPUT ARITHMETIC LOGIC UNIT WITH SHIFTER U.S. patent application Ser. No. 08/159,282 filed Nov. 30, 1993 and entitled "THREE INPUT ARITHMETIC LOGIC UNIT WITH MASK GENERATOR";

U.S. patent application Ser. No. 08/160,111 filed Nov. 30, 1993 and entitled "THREE INPUT ARITHMETIC LOGIC UNIT WITH BARREL ROTATOR AND MASK GENERATOR";

U.S. patent application Ser. No. 08/160,298 filed Nov. 30, 1993 and entitled "THREE INPUT ARITHMETIC LOGIC UNIT WITH SHIFTER AND MASK GENERATOR";

U.S. Pat. No. 5,486,411 issued Jan. 16, 1996 and entitled "THREE INPUT ARITHMETIC LOGIC UNIT FORMING THE SUM OF A FIRST INPUT ADDED WITH A FIRST BOOLEAN COMBINATION OF A SECOND INPUT AND THIRD INPUT PLUS A SECOND BOOLEAN COMBINATION OF THE SECOND AND THIRD INPUTS";

U.S. Pat. No. 5,465,224 issued Nov. 7, 1995 and entitled "THREE INPUT ARITHMETIC LOGIC UNIT FORMING THE SUM OF FIRST BOOLEAN COMBINATION OF FIRST, SECOND AND THIRD INPUTS PLUS A SECOND BOOLEAN COMBINATION OF FIRST, SECOND AND THIRD INPUTS";

U.S. Pat. No. 5,493,524 issued Feb. 20, 1996 and entitled "THREE INPUT ARITHMETIC LOGIC UNIT EMPLOYING CARRY PROPAGATE LOGIC";

U.S. patent application Ser. No. 08/160,300 filed Nov. 30, 1993 and entitled "DATA PROCESSING APPARATUS, SYSTEM AND METHOD FOR IF, THEN, ELSE OPERATION USING WRITE PRIORITY";

U.S. patent application Ser. No. 08/208,413 "TRANSPARENCY AND PLANE MASKING IN TP TRANSFER PROCESSOR";

U.S. patent application Ser. No. 08/208,161 "PIXEL BLOCK WITH TRANSPARENCY";

U.S. patent application Ser. No. 08/208,171 "MESSAGE PASSING AND BLAST INTERRUPT FROM PROCESSOR";

U.S. patent application Ser. No. 08/209,123 "GUIDED TRANSFERS WITH X,Y DIMENSION AND VARIABLE STEPPING";

U.S. patent application Ser. No. 08/209,124 "GUIDED TRANSFER LINE DRAWING";

U.S. patent application Ser. No. 08/208,517 "TRANSFER PROCESSOR MEMORY INTERFACE CONTROLS DIFFERENT MEMORY TYPES SIMULTANEOUSLY"; and U.S. patent application Ser. No. 08/207,503 "ARCHITECTURE OF TP TRANSFER PROCESSOR".

This application is also related to the following concurrently filed U.S. patent applications, all of which are hereby incorporated by reference:

U.S. patent application Ser. No. 08/207,987 filed Mar. 8, 1993 and entitled "MP VECTOR INSTRUCTIONS FP+LOAD/STORE"; and U.S. patent application Ser. No. 08/207,992 filed Mar. 8, 1993 and entitled "NORMALIZATION METHOD FOR FLOATING POINT NUMBERS".

TECHNICAL FIELD OF THE INVENTION

The technical field of this invention is the field of digital data processing and more particularly microprocessor circuits, architectures and methods for digital data processing especially digital image/graphics processing.

BACKGROUND OF THE INVENTION

The inventive embodiments have many applications some of which relate to the field of computer graphics, discussed herein as an illustrative background. In a field of computer graphics known as bit mapped graphics, computer memory stores data for each individual picture element or pixel of an image at memory locations that correspond to the location of that pixel within the image. This image may be an image to be displayed or a captured image to be manipulated, stored, displayed or retransmitted. The field of bit mapped computer graphics has benefited greatly from the lowered cost and increased capacity of dynamic random access memory (DRAM) and the lowered cost and increased processing power of microprocessors. These advantageous changes in the cost and performance of component parts enable larger and more complex computer image systems to be economically feasible.

The field of bit mapped graphics has undergone several stages in evolution of the types of processing used for image data manipulation. Initially a computer system supporting bit mapped graphics employed the system processor for all bit mapped operations. This type of system suffered several drawbacks. First, the computer system processor was not particularly designed for handling bit mapped graphics. Design choices that are very reasonable for general purpose computing are unsuitable for bit mapped graphics systems. Consequently some routine graphics tasks operated slowly. In addition, it was quickly discovered that the processing needed for image manipulation of bit mapped graphics was so loading the computational capacity of the system processor that other operations were also slowed.

The next step in the evolution of bit mapped graphics processing was dedicated hardware graphics controllers. These devices can draw simple figures, such as lines, ellipses and circles, under the control of the system processor. Some of these devices can also do pixel block transfers (PixBlt). A pixel block transfer is a memory move operation of image data from one portion of memory to another. A pixel block transfer is useful for rendering standard image elements, such as alphanumeric characters in a particular type font, within a display by transfer from nondisplayed memory to bit mapped display memory. This function can also be used for tiling by transferring the same small image to the whole of bit mapped display memory. Built-in algorithms for performing some of the most frequently used graphics functions provide a way of improving system performance. Also a graphics computer system may desirably include other functions besides those few that are implemented in such a hardware graphics controller. These additional functions might be implemented in software by the system processor. These hardware graphics controllers will typically allow the system processor only limited access to the bit map memory. This limits the degree to which system software can augment the fixed set of functions of the hardware graphics controller.

The graphics system processor represents yet a further step in the evolution of bit mapped graphics processing. A graphics system processor is a programmable device that has all the attributes of a microprocessor and also includes special functions for bit mapped graphics. The TMS34010 and TMS34020 graphics system processors manufactured by Texas Instruments Incorporated represent this class of devices. These graphics system processors respond to a stored program in the same manner as a microprocessor and include the capability of data manipulation via an arithmetic logic unit, data storage in register files and control of both program flow and external data memory. In addition, these devices include special purpose graphics manipulation hardware that operate under program control. Additional instructions within the instruction set of these graphics system processors control the special purpose graphics hardware. These instructions and the hardware that supports them are selected to perform base level graphics functions that are useful in many contexts. Thus a graphics system processor can be programmed for many differing graphics applications using algorithms selected for the particular problem. This provides an increase in usefulness similar to that provided by changing from hardware controllers to programmed microprocessors. Because such graphics system processors are programmable devices in the same manner as microprocessors, they can operate as stand alone graphics processors, graphics co-processors slaved to a system processor or tightly coupled graphics controllers.

Several fields would desirably utilize more cost effective, powerful graphics operations to be economically feasible. These include video conferencing, multi-media computing with full motion video, high definition television, color facsimile, smart photocopiers, image recognition systems and digital photography, among other examples. Each of these fields presents unique problems. Image data compression and decompression are common themes in some of these applications. The amount of transmission bandwidth and the amount of storage capacity required for images and particular full motion video is enormous. Without efficient video compression and decompression that result in acceptable final image quality, these applications will be limited by the costs associated with transmission bandwidth and storage capacity. There is also a need in the art for a single system that can support both image processing functions such as image recognition and graphics functions such as display control.

SUMMARY OF THE INVENTION

A data processor includes both integer and floating point operation units and operates as a reduced instruction set computer (RISC). A modification of the normal load/store RISC operations includes within its instruction set some instructions that permit floating point operations to be paired with load or store operations. These operations include: vector floating point add; vector multiply accumulate; vector floating point multiply; vector multiply subtract; vector reverse subtract; vector round floating point input; vector round integer input; and vector floating point subtract.

The vector instructions are implemented to allow a load or a store in parallel with a floating point instruction. This is feasible because the floating point units are separate from the address calculation unit needed to compute the address for the memory operation. In the preferred embodiment, an integer arithmetic logic unit is employed for address calculation. This integer arithmetic logic unit may be used for add, subtract and logical operations and to compute branch target address during relative branches. This integer arithmetic logic unit would generally be idle during floating point operations. Therefor little addition hardware is needed. The instruction word includes formats that permit the normal register specification for the floating point operation as well as allowing bits for encoding the address computation within the same instruction word. Only compound floating point operations, such as multiply and accumulate require the use of an implied accumulator destination for computing order to include the memory access encoding. Longer instructions are needed only for long immediate instruction formats.

In the preferred embodiment of this invention, the data processor is one data processors embodied as a part of a multiprocessor formed in a single integrated circuit used in image processing.

BRIEF DESCRIPTION OF THE FIGURES

These and other aspects of the present invention are described below together with the Figures, in which:

FIG. 7 illustrates the control registers of the master processor;

FIG. 8 illustrates the integer pipeline operation of the master processor;

FIGS. 9a to 9c illustrate the instruction formats of the master processor;

FIG. 17 illustrates the encoding of the vector floating point add instruction of the master processor;

FIG. 18 illustrates the encoding of the vector multiply accumulate instruction of the master processor;

FIG. 19 illustrates the encoding of the vector floating point multiply instruction of the master processor;

FIG. 20 illustrates the encoding of the vector multiply subtract instruction of the master processor;

FIG. 21 illustrates the encoding of the vector reverse subtract instruction of the master processor;

FIG. 22 illustrates the encoding of the vector round floating point input instruction of the master processor;

FIG. 23 illustrates the encoding of the vector round integer input instruction of the master processor;

FIG. 24 illustrates the encoding of the vector floating point subtract instruction of the master processor;

FIG. 25 illustrates the encoding of the vector load instruction of the master processor;

FIG. 26 illustrates the encoding of the vector store instruction of the master processor;

FIG. 27 illustrates the combined add and multiply floating point pipeline operation of the master processor;

FIG. 29 illustrates an example of color facsimile system including a multiprocessor integrated circuit having a single digital image/graphics processor.

DETAILED DESCRIPTION OF PREFERRED EMBODIMENTS

Figure 1:
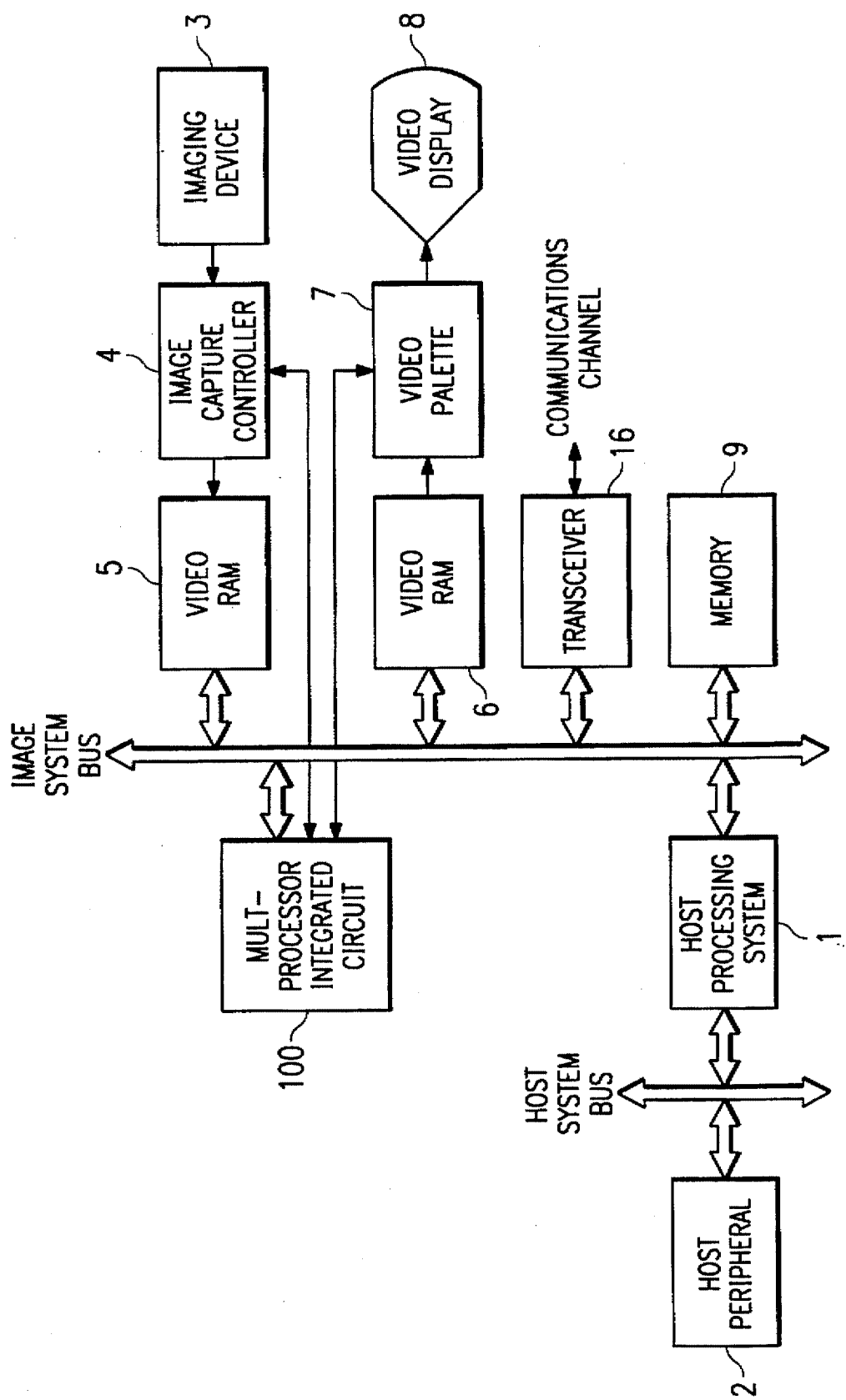
FIG. 1 illustrates the system architecture of an image processing system such as would employ this invention.

FIG. 1 is a block diagram of an image data processing system including a multiprocessor integrated circuit constructed for image and graphics processing according to this invention. This data processing system includes a host processing system 1. Host processing system 1 provides the data processing for the host system of data processing system of FIG. 1. Included in the host processing system 1 are a processor, at least one input device, a long term storage device, a read only memory, a random access memory and at least one host peripheral 2 coupled to a host system bus. Because of its processing functions, the host processing system 1 controls the function of the image data processing system.

Multiprocessor integrated circuit 100 provides most of the data processing including data manipulation and computation for image operations of the image data processing system of FIG. 1. Multiprocessor integrated circuit 100 is bi-directionally coupled to an image system bus and communicates with host processing system 1 by way of this image system bus. In the arrangement of FIG. 1, multiprocessor integrated circuit 100 operates independently from the host processing system 1. The multiprocessor integrated circuit 100, however, is responsive to host processing system 1.

FIG. 1 illustrates two image systems. Imaging device 3 represents a document scanner, charge coupled device scanner or video camera that serves as an image input device. Imaging device 3 supplies this image to image capture controller 4, which serves to digitize the image and form it into raster scan frames. This frame capture process is controlled by signals from multiprocessor integrated circuit 100. The thus formed image frames are stored in video random access memory 5. Video random access memory 5 may be accessed via the image system bus permitting data transfer for image processing by multiprocessor integrated circuit 100.

The second image system drives a video display. Multiprocessor integrated circuit 100 communicates with video random access memory 6 for specification of a displayed image via a pixel map. Multiprocessor integrated circuit 100 controls the image data stored in video random access memory 6 via the image system bus. Data corresponding to this image is recalled from video random access memory 6 and supplied to video palette 7. Video palette 7 may transform this recalled data into another color space, expand the number of bits per pixel and the like. This conversion may be accomplished through a look-up table. Video palette 7 also generates the proper video signals to drive video display 8. If these video signals are analog signals, then video palette 7 includes suitable digital to analog conversion. The video level signal output from the video palette 7 may include color, saturation, and brightness information. Multiprocessor integrated circuit 100 controls data stored within the video palette 7, thus controlling the data transformation process and the timing of image frames. Multiprocessor integrated circuit 100 can control the line length and the number of lines per frame of the video display image, the synchronization, retrace, and blanking signals through control of video palette 7. Significantly, multiprocessor integrated circuit 100 determines and controls where graphic display information is stored in the video random access memory 6. Subsequently, during readout from the video random access memory 6, multiprocessor integrated circuit 100 determines the readout sequence from the video random access memory 6, the addresses to be accessed, and control information needed to produce the desired graphic image on video display 8.

Video display 8 produces the specified video display for viewing by the user. There are two widely used techniques. The first technique specifies video data in terms of color, hue, brightness, and saturation for each pixel. For the second technique, color levels of red, blue and green are specified for each pixel. Video palette 7 video display 8 are designed and fabricated to be compatible with the selected technique.

FIG. 1 illustrates an additional memory 9 coupled to the image system bus. This additional memory may include additional video random access memory, dynamic random access memory, static random access memory or read only memory. Multiprocessor integrated circuit 100 may be controlled either in wholly or partially by a program stored in the memory 9. This memory 9 may also store various types of graphic image data. In addition, multiprocessor integrated circuit 100 preferably includes memory interface circuits for video random access memory, dynamic random access memory and static random access memory. Thus a system could be constructed using multiprocessor integrated circuit 100 without any video random access memory 5 or 6.

FIG. 1 illustrates transceiver 16. Transceiver 16 provides translation and bidirectional communication between the image system bus and a communications channel. One example of a system employing transceiver 16 is video conferencing. The image data processing system illustrated in FIG. 1 employs imaging device 3 and image capture controller 4 to form a video image of persons at a first location. Multiprocessor integrated circuit 100 provides video compression and transmits the compressed video signal to a similar image data processing system at another location via transceiver 16 and the communications channel. Transceiver 16 receives a similarly compressed video signal from the remote image data processing system via the communications channel. Multiprocessor integrated circuit 100 decompresses this received signal and controls video random access memory 6 and video palette 7 to display the corresponding decompressed video signal on video display 8. Note this is not the only example where the image data processing system employs transceiver 16. Also note that the bidirectional communications need not be the same type signals. For example, in an interactive cable television signal the cable system head end would transmit compressed video signals to the image data processing system via the communications channel. The image data processing system could transmit control and data signals back to the cable system head in via transceiver 16 and the communications channel.

FIG. 1 illustrates multiprocessor integrated circuit 100 embodied in a system including host processing system 1. Those skilled in the art would realize from the disclosure the preferred embodiments of the invention that multiprocessor integrated circuit 100 may also be employed as the only processor of a useful system. In such a system multiprocessor integrated circuit 100 is programmed to perform all the functions of the system.

This multiprocessor integrated circuit 100 is particularly useful in systems used for image processing. Multiprocessor integrated circuit 100 preferably includes plural identical processors. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

Figure 2:
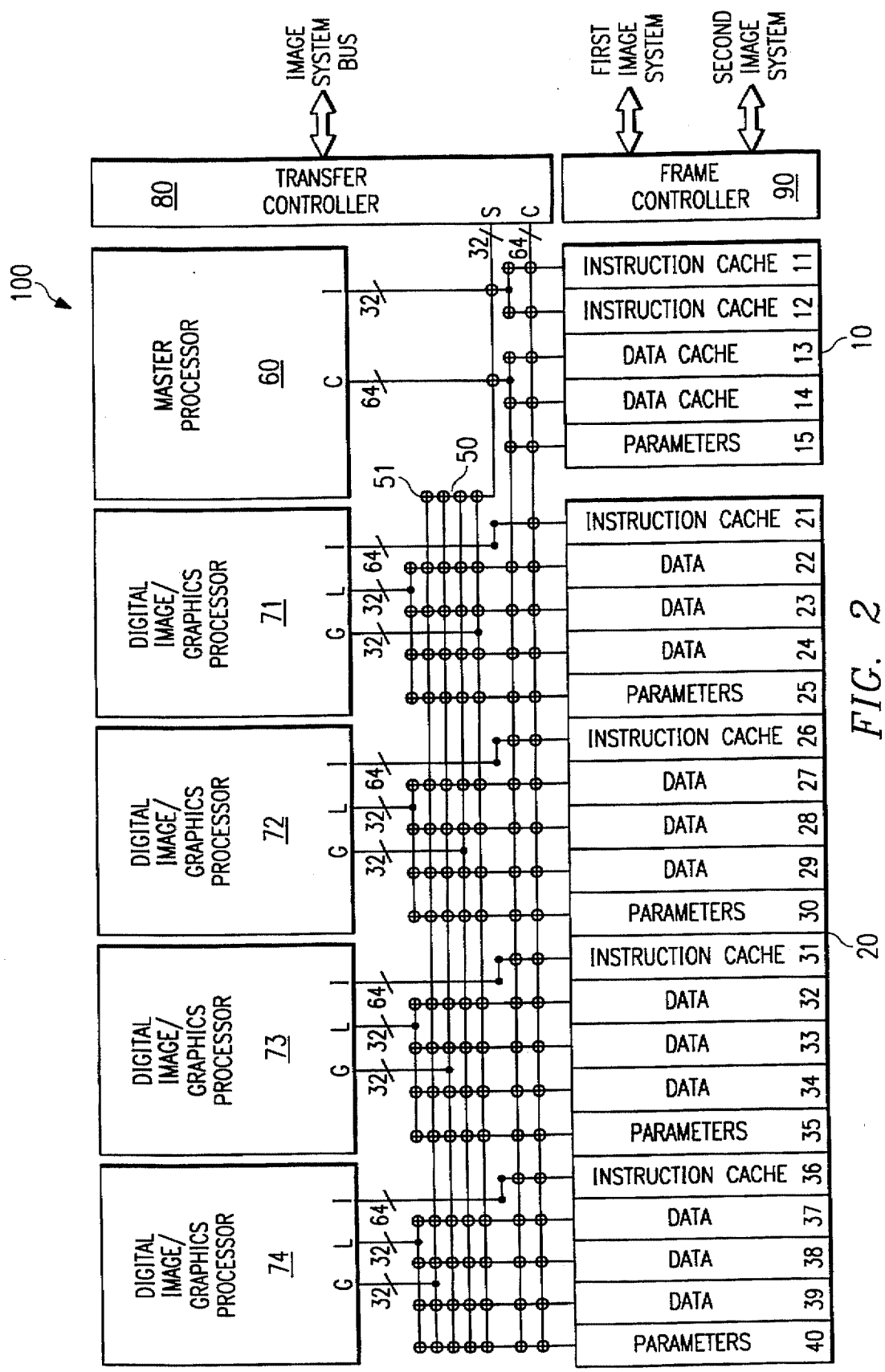
FIG. 2 illustrates the architecture of a single integrated circuit multiprocessor that forms the preferred embodiment of this invention.

FIG. 2 illustrates the architecture of the multiprocessor integrated circuit 100. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multimedia computing. Since there are computing applications other than image and graphics processing where these processors will be useful, reference to processors 71, 72, 73 and 74 as image/graphics processors is for convenience only.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 includes 2K bytes for example, with a total memory within multiprocessor integrated circuit 100 of 50 K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit instruction words from the corresponding instruction cache. A local data port (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories of random access memory 20. Master Processor 60 includes two memory ports. An instruction port (I) may fetch a 32 bit instruction word from either of the instruction caches 11 and 12. A data port (C) may read a 32 bit data word from or write a 32 bit data word into data caches 13 or 14, parameter memory 15 of random access memory 10 or any of the data memories, the parameter memories or random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2K bytes of memory, there is 4K bytes of instruction cache and 4K bytes of data cache. Cache control is an integral function of master processor 60. As previously mentioned, master processor 60 may also access other memory sections via crossbar 50.

The four digital image/graphics processors 71, 72, 73 and 74 each have a highly parallel digital signal processor (DSP)

architecture. Digital image/graphics processors 71, 72, 73 and 74 achieve a high degree of parallelism of operation employing three separate units: a data unit; an address unit; and a program flow control unit. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be independent or cooperative. In the latter case crossbar 50 enables inter-processor communication in combination with the shared memory. Digital image/graphics processors 71, 72, 73 and 74 may also operate in a synchronized MIMD mode. In the synchronized MIMD mode, the program control flow unit of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently queues, sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/graphics processors 71, 72, 73 and 74 may request data transfers from transfer controller 80 as linked list packet transfers. These linked list packet transfers allow multi-dimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controller 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width in this embodiment. This permits architecture flexibility by accommodating the addition or removal of digital image/graphics processors and corresponding memory modularly while maintaining the same pin out.

In one embodiment all parts of multiprocessor integrated circuit 100 are disposed on a single integrated circuit, which is formed in complementary metal oxide semiconductor (CMOS) using feature sizes of 0.6 μm. Multiprocessor integrated circuit 100 is suitably constructed in a pin grid array package having 256 pins. The inputs and outputs are compatible with transistor-transistor logic (TTL) logic voltages for example. Multiprocessor integrated circuit 100 includes about 3 million transistors and employs a clock rate of 50 MHz.

Master processor 60 is a 32 bit RISC (reduced instruction set computer) processor the employs a load/store architecture and 3 operand arithmetic and logical instructions. Master processor 60 includes thirty one 32 bit general purpose registers and IEEE standard 754 floating point hardware. The instruction set supports both 15 bit and 32 bit immediate constants. The instruction set includes vector instructions that initiate a floating point operation and a parallel load or store in one instruction.

Figure 3:
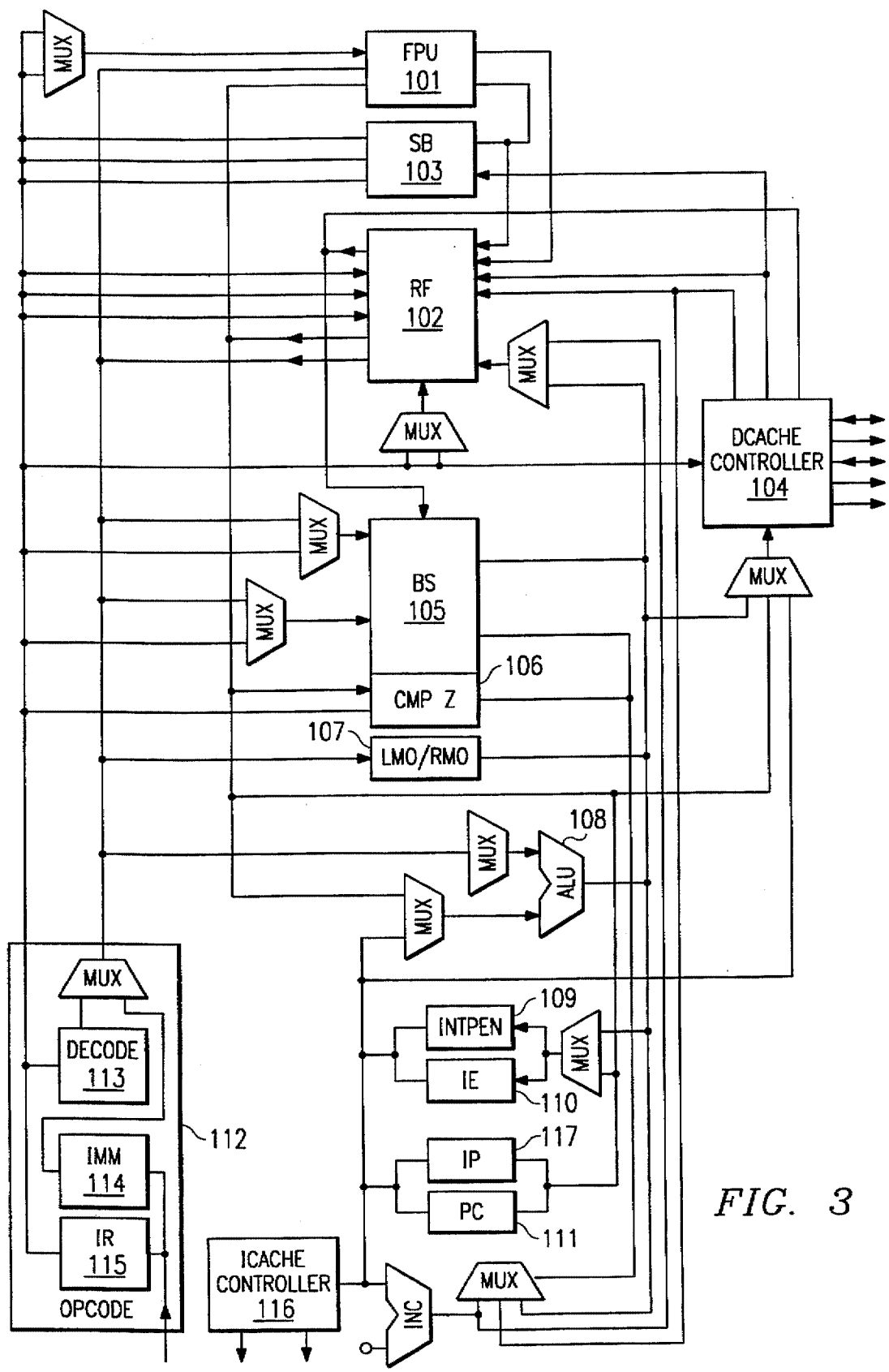
FIG. 3 illustrates the architecture of the master processor in the preferred embodiment of this invention.

FIG. 3 shows a simplified diagram of master processor 60. Major blocks of master processor 60 are: a floating point unit (FPU) 101; a register file (RF) 102; a register scoreboard (SB) 103 that ensures results of floating point operations and memory loads are available before they are used as sources and arbitrates between data cache and floating point unit 101 for access to their shared write port to register file 102; a data cache controller 104 which also handles the interface to the on-chip memory via the crossbar and to external memory via transfer processor 80; a barrel shifter (BS) 105 that performs shift instructions; compare to zero logic 106; left most one/right most one detection logic (LMO/RMO) 107; integer arithmetic logic unit (ALU) 108 used for add, subtract and logical operations and to compute branch target address during relative branches; interrupt pending register (INTPEN) 109 that receives master processor interrupt signals; interrupt enable register (IE) 110 that selectively enables or disables interrupts; program counter register (PC)

111 holds the address of the instruction to be fetched; program counter incrementer (INC) 112 that increments program counter 111 to point to the next instruction, with the incremented value can also be routed to the register file as a "return" or "link" address; instruction decode logic (DECODE) 113 that decodes instruction and supplies control signals to the operating units; instruction register (IR) 114 that holds the address of the instruction being executed; immediate register (IMM) 115 that stores any instruction immediate data; and the instruction cache controller (ICACHE) 116, that provides instructions to be executed, interfaces to transfer processor 80 for cache fills.

Figure 4A:
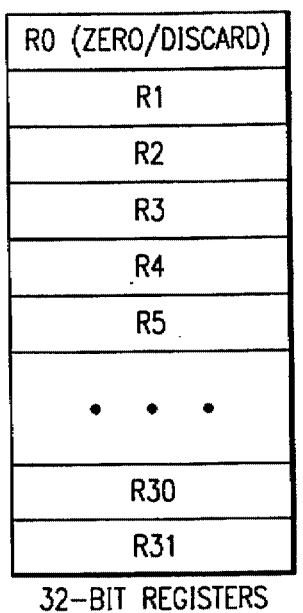
FIGS. 4a and 4b illustrate the organization of the data registers of the master processor.
Figure 4B:
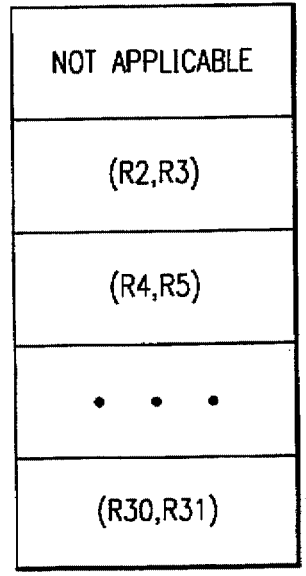

A programmers model of register file 102 of master processor 60 is illustrated in FIG. 4. Register file 102 has thirty one 32 bit general purpose registers R1 to R31 in register file 102. The thirty second general purpose register would be R0, however R0 is not a true register as it always reads as zero and writes to it are discarded. These may be addressed individually in single precision as shown in FIG. 4a. Double precision values are stored in an even-odd pair as illustrated in FIG. 4b. The higher numbered register always holds the sign bit and the exponent. The higher numbered register holds additional mantissa. Since R0 always reads as zero, the R0/R1 pair of registers is not available for double precision use. In addition R1 is illegal as the destination of any operation which is executed by the floating point unit. To keep the registers with special uses contiguous the following software convention is suggested:

R0—Hardware zero
R1—Stack pointer
R2—Frame Pointer (If required)
R3—Link (Return Address) Register
R30—Compiler "status" register
R31 - Reserved for assembler to generate pseudo-operations.

Figure 5A:
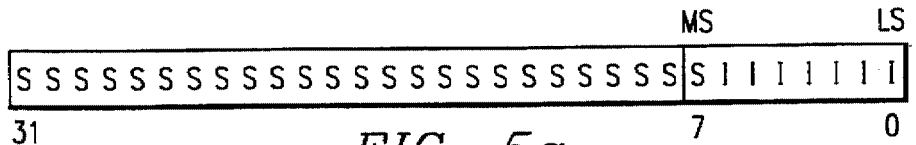
FIGS. 5a to 5g illustrate examples of the manner of storage of single precision data in the registers of the master processor.
Figure 5B:
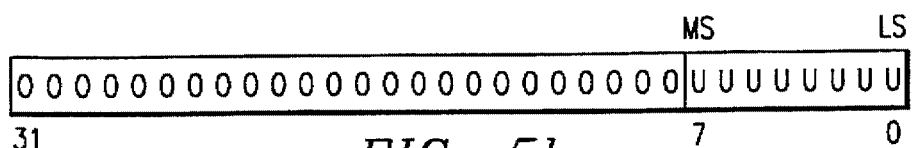
Figure 5C:
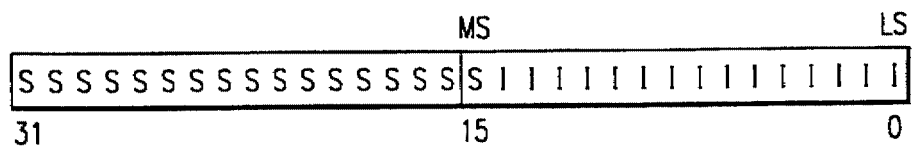
Figure 5D:
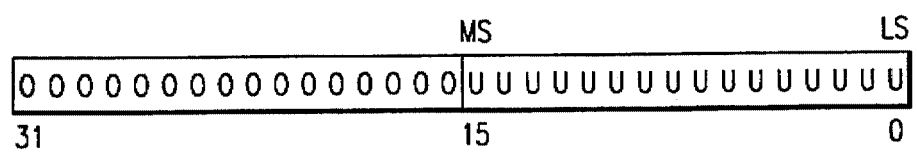
Figure 5E:
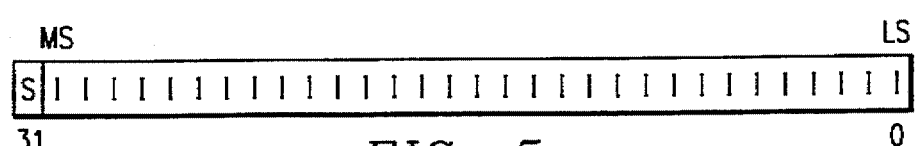
Figure 5F:
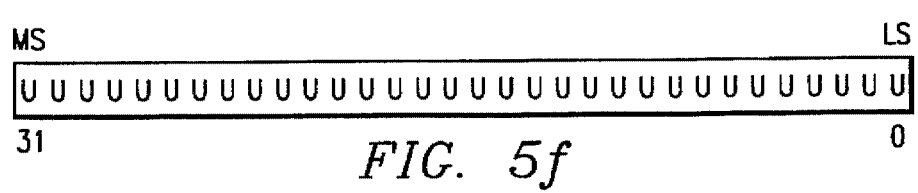

FIGS. 5a to 5g and FIGS. 6a and 6b illustrate how data is stored in the data registers R1 to R31 of register files 102. FIGS. 5a to 5g illustrate single precision mode employing 32 bits. FIG. 5a shows storage of an 8 bit signed integer. The 7 bits of the integer I are stored in the least significant bits 6-0. The sign bit S is stored in bit 7 and repeated in bits 31-8. FIG. 5b shows storage of an 8 bit unsigned integer. The 8 bits of the unsigned integer U are stored in the least significant bits 7-0 and the 24 most significant bits are filled with "0". FIG. 5c shows storage of a 16 bit signed integer. The 15 bits of the integer I are stored in the least significant bits 15-0. The sign bit S is stored in bit 16 and repeated in bits 31-17. FIG. 5d shows storage of a 16 bit unsigned integer. The 16 bits of the unsigned integer U are stored in the least significant bits 15-0 and the 16 most significant bits are filled with "0". FIG. 5e shows storage of a 32 bit signed integer. The 31 bits of the integer I are stored in bits 30-0 and the sign bit S is stored in bit 31. FIG. 5f shows storage of 32 bit unsigned integer. The 32 bits of the unsigned integer U fill the register.

Figure 5G:

FIG. 5g illustrates the storage of a 32 bit floating point number. The sign is stored in the most significant bit 31. Bits 30-23 store 8 bits of a binary exponent. According the convention these 8 bits employ a bias of decimal 127, thus binary "10000000" represents $2^0$. As will be further explained below, a normalized floating point number always has a binary mantissa between 1 and 2. Therefore the leading "1" is implied rather than specifically stored. Bits 22-0 store the fractional part of the mantissa. This format results in an expressed number:

$$SP=(-1)^S \times (1+M) \times 2^{(E-127)}$$

where: SP is the single precision expressed number; S is the sign; M equals the fractional mantissa; and E is the exponent.

Figure 6A:
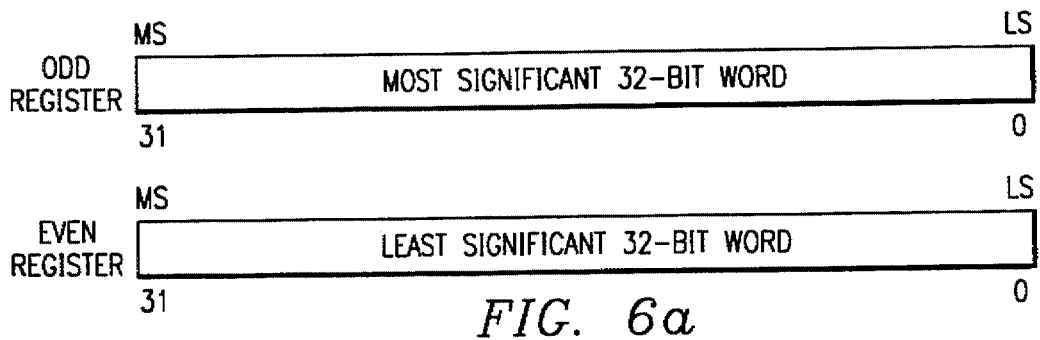
FIGS. 6a and 6b illustrate examples of the manner of storage of double precision data in the registers of the master processor.
Figure 6B:
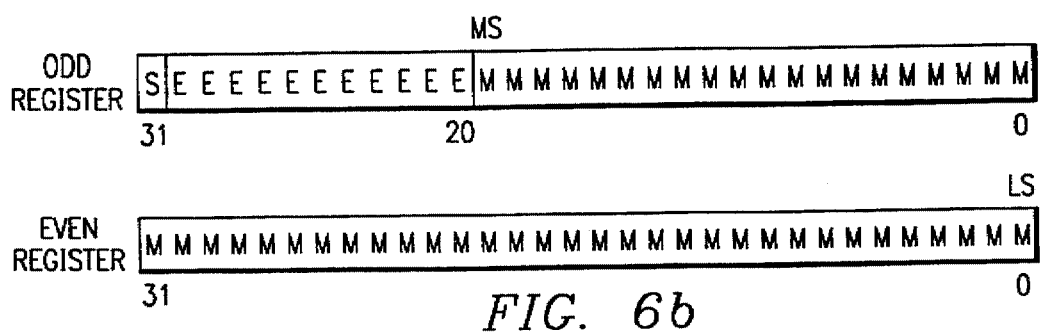

FIGS. 6a and 6b illustrate data storage in double precision mode employing 64 bits. FIG. 6a illustrates storage of a 64 bit integer. Note that the odd register stores the most significant bits and the even register stores the least significant bits. FIG. 6b illustrates storage of a 64 bit floating point number. Bit 31 of the odd register stores the sign. Bits 30-20 of the odd register store 11 bits of binary exponent. By convention this exponent is expressed with a bias of 1023. Bits 19-0 of the odd register store the 20 most significant bits of the fractional part of the mantissa. The even register stores the 32 least significant bits of the mantissa. This format results in an expressed number:

$$DP=(-1)^S \times (1+M) \times 2^{(E-1023)}$$

where: DP is the single precision expressed number; S is the sign; M equals the fractional mantissa; and E is the exponent.

FIG. 7 illustrates the control registers of master processor 60. Some of these control registers were previously described in conjunction with FIG. 3. Floating point status register FPST 118 will be further described below.

Configuration register CONFIG 119 allows certain aspects of the MVP to be configured by the user. Configuration register CONFIG 119 includes: a bit that reflects the current endian mode, big endian or little endian; a bit that enables the round robin crossbar prioritization the global and local buses of digital image/graphics processors 71, 72, 73 and 74; a bit that disables the round-robin prioritization of packet requests by transfer controller 60. If this bit is set to one, the priorities are fixed.

Registers TCOUNT 120 and TSCALE 121 are part of a timer in the master processor 60 employed to provide an on-chip time reference. Register TCOUNT 120 is a down counter which decrements by one on every clock. Register TSCALE 121 contains the value with which register TCOUNT 120 is re-loaded when it reaches zero. This sets the time between interrupts. When the count stored in register TCOUNT reaches zero the timer generates an interrupt to 60 master processor and register TCOUNT 120 is re-loaded from register TSCALE 120. The interrupt handler may read register TCOUNT 120 to determine the time that has elapsed since the last timer interrupt was posted.

The fault interface register FLTINF 122, the fault cache tag register FLTTAG 123, the fault address register FLTADD 124 and the two fault data registers FLTDTH 125 and FLTDTL 126 are employed to aid in recover from external memory faults. These may include faults relating to instruction cache 11 and 12, and data caches 13 and 14. The fault interface register FLTINF 122 stores data relating to the type of fault encountered. These include the type of operation (load, store, direct external access, cache flush, etc.), the data size, whether the fault was on instruction cache or data cache and the block number of the cache block where the fault occurred. Fault cache tag register FLTTAG 123 stores the cache tag data upon encountering the external memory fault. Fault address register FLTADD 124 stores the memory address that resulted in an external memory fault. Fault data high register FLTDTH 125 stores the 32 most significant bits and fault data low register FLTDTL 126 stores the 32 least significant bits of data to be written which resulted in an external memory fault. If the data size was 32 bits or less, all the write data is stored in fault data low register FLTDTL 126.

Processor error register PPERROR 127 receives a posting of when one of digital image/graphics processors 71, 72, 73 or 74 detects an illegal instruction. This causes an interrupt of master processor 60. The interrupt handler of master processor 60 can examine processor error register PPERROR 127 to determine the cause.

Packet request register PKTREQ 128 controls submission of packet transfers to transfer controller 80.

Input pointers IN0P 129 and IN1P 130 and output pointer OUTP 131 are used in vector load and store operations, respectively. Vector load and store operations are similar to normal register load and register store operations. They differ in that the target addresses are stored in these register pointers, which are auto-incremented following memory access to point to the next memory word. This auto-increment differs based upon whether the vector load or store is single precision or double precision. In addition, vector load and store operations can take place in parallel with certain floating point operations. This will be further described below.

FIG. 8 shows the basic pipeline used in master processor 60. Master processor 60 has a three stage pipeline including fetch, execute and memory stages. FIG. 8 shows how three instructions through the pipeline. During the fetch stage of the pipeline program counter 111 is used to address the instruction cache and read a 32 bit instruction. During the execute stage the instruction is decoded, the source operands read from the register file, the operation performed, and a result written back to the register file. The memory stage is only present for load and store operations. The address calculated during the execute stage is used to address the data cache and the data are read or written. If a miss occurs on the instruction cache, the fetch and execute pipelines are stalled until the request can be serviced. If a miss occurs on the data cache, the memory pipeline stalls, but the fetch and execute pipelines continue to flow, until another memory operation needs to be initiated.

The register scoreboard 103 is a set of 1 bit flags, two for each of the general purpose registers. One scoreboard bit indicates that the register is waiting for a memory load to complete. The other scoreboard bit indicates that the register is waiting for a floating point operation to complete. The appropriate bit is set during the execute stage by any instruction which will not complete, that is write its results back to the register file, during the execute stage. This includes all the load instructions, floating-point instructions, and integer multiply.

When the operands are read from the register file at the beginning of the execute stage the scoreboard bits for the source and destination registers are also accessed. If any scoreboard bits are set, then the pipeline stalls and update of the pipeline registers, and the destination register is inhibited. This causes the same instruction to be attempted on the next cycle. Eventually the floating point unit or the memory unit completes its operation, which clears the corresponding scoreboard bits. The stalled instruction is then allowed to complete. There are two bits to allow the bits relating to floating point operations to be temporarily removed from register scoreboard 103 while the floating point unit 101 is stalled due to an exception.

The above pipeline implies one branch delay slot. Program counter 111 is loaded by branch instructions at the end of the execute stage. The new value is used for a fetch in next cycle. Thus one instruction in the old stream is fetched in parallel with the execute stage of the branch instruction. There is at least one load delay slot. Data are loaded from memory via the data cache at the end of the memory stage. Thus it is not available for use by the instruction following the load. This fact is recorded in the register scoreboard 103 and if the following instruction uses the load's destination register as a source the pipeline freezes until the data are available. In fact, if a data cache miss occurs the load can take substantially longer than one cycle. In this case the scoreboard bit is not cleared until the load completes.

Where possible, instructions should be scheduled to allow for this behavior. That is, at least one instruction which does not depend on the value loaded should follow the load, and additional instructions would be beneficial in hiding cache misses. However, if instructions cannot be found there is no need to insert nop instructions because register scoreboard 103 automatically causes the pipeline to stall. The delayed load also implies an extra write port to the register file. As the data are not available during the execute stage they do not use the normal port at that time. When the data do arrive the normal port typically is in use so they use one of their own. A delayed load and a non-delayed operation are not allowed to attempt to write to the same register in the same cycle because register scoreboard 103 has stalled the non-delayed operation.

FIGS. 9a to 9c illustrate the three basic instruction formats employed by master processor 60. FIG. 9a illustrates the short immediate instruction format. This format allows a 15 bit immediate operand, one source register and a destination register to be specified. The 15 bit immediate value is considered to be signed for some instructions and unsigned for others. The bits in the OPCODE field (bits 21–15) define the operation of the instruction. FIG. 9b illustrates the three register instruction format. This format allows the specification of two source registers and one destination register. The bits in the OPCODE field (bits 19–13) define the operation of the instruction. The bits of the OPTIONS field (bits 11-5) are either ignored or specify options to the instruction. FIG. 9c illustrates the long immediate instruction format. This format allows all the options of the 3 register form and a 32-bit immediate constant. Note when a long immediate instruction is decoded, the execute stage of the pipeline stalls for at least one cycle to enable the immediate constant to be loaded. The fetch stage is modified to employ the 32 bit immediate constant as an operand rather than as an instruction. If the same operation can be specified in all forms the 7-bit OPCODE field of the instruction is the same in all three forms, with the register and long immediate forms having a "11" prefix.

Master processor 60 supports the IEEE Standard 754 floating point operation. Hardware support consists of a full double precision (64 bit) arithmetic logic unit and a single precision (32 bit) multiplier. The floating point hardware is pipelined and the multiplier is supported with microcode to give a high performance. A single precision multiply or a double precision add can be started in each cycle.

Floating point operands are read from the register file when the instruction is dispatched. Execution will typically take more than one cycle. The result is stored back into the register file when the instruction completes. Register scoreboard 103 synchronizes use of the results. The floating point unit has a dedicated write port to register file 102 to allow floating point instructions to write to register file 102 in parallel with the memory interface.

This is a brief description of the numbering system, a complete description is in the IEEE standard 754–1985. The number formats and types for the floating point unit 101 are single precision (32 bit) and double precision (64 bit).

A floating point number is made up of two parts: the mantissa and the exponent. The value of the number is then "$mantissa \times radix^{exponent}$". The IEEE standard 754 uses a radix of two (binary), and a signed magnitude form for the mantissa. There are several number "categories" within each precision. Some categories represent ranges of numbers and others are abstract types.

Normal numbers are those numbers within the range of the given precision. The term normalized comes from the fact that the mantissa of a normalized number ranges from 1 to 2. This fact is used in several ways in the multiply and divide algorithms. Because the value is between 1 and 2 the most significant bit of the mantissa is always 1. This fact is used by not explicitly encoding the most significant bit, it is called the hidden bit HB or implied bit. When a number is written with the hidden bit not explicitly shown the number is said to be in a packed format. Conversely, if the hidden bit is explicitly shown the number is said to be in an unpacked format.

The IEEE standard 754 uses what is called a biased exponent. This is an exponent with a constant offset bias. The result of the exponent bias is that all exponents are positive numbers. The single precision bias is 127 and the double precision bias is 1023.

Denormal numbers fall between the minimum normal number and zero. They are identified in the packed format by an exponent of all zeroes and a non zero mantissa. In this case the hidden bit is a zero. The real value of the biased exponent is one, but the exponent is stored in the register file in packed format as a zero so that denormal numbers can be distinguished from normal numbers.

The infinity number is another type of floating point number with special features corresponding to the mathematical concept of infinity. It is defined as a number whose exponent is all ones and the packed mantissa equal to zero. It can have either sign. The hidden bit is zero.

The NaN (not-a-number) has no numerical value, but does have special meanings. There are two types of NaNs: signalling NaN (SNaN); and quiet NaN (QNaN). If an signaling NaN is used as an input operand to a floating point instruction, the invalid operation exception is signaled and a quiet NaN is returned. If a quiet NaN is used as an operand to a floating point instruction without a signaling NaN as the other operand, the invalid operation exception is not signalled and that quiet NaN is returned. If two quiet NaNs are used as operands to a floating point instruction then the source 1 quiet NaN will be returned. For mixed precision instructions including conversions of floating point numbers to another precision, the exact input quiet NaN can not be copied to the output. When the input quiet NaN is single precision and the output quiet NaN is double precision, the mantissa of the single precision quiet NaN will be 0 extended to fit the double precision. The sign will be copied. The double precision exponent will be all "1's". When the input quiet NaN is double precision and the output quiet NaN is single precision, the mantissa of the double precision quiet NaN will be truncated to the single precision. The sign will be copied. The single precision exponent will be all "1's". The output of all invalid operations is a quiet NaN and to simplify design it will always be the same quiet NaN. That quiet NaN will be all "1's".

The definition of what is an signaling NaN is not specified by the IEEE standard 754, but it does require that a system support both signalling and quiet NaNs. In general NaN's are defined as a number with all ones in the exponent and a non-zero mantissa. In master processor 60 the most significant bit of the packed mantissa to denotes the difference between a signaling NaN and a quiet NaN.

The sign of a NaN doesn't matter. The exponent of a NaN is all "1". The hidden bit of a NAN is "1". A signaling NaN has a packed most significant bit equal to "0" and a mantissa not equal to "0". A quiet NaN has a packed most significant bit of "1".

The wrapped format is used to represent numbers that have exceeded the exponent range for a particular format (single precision or double precision). For example, when a single precision denormalized number is normalized, the exponent will become too small (<Hex "01") for the standard single precision exponent to represent. The exponent underflow will then be represented in a wrapped format, meaning that the exponent has gone below a biased value of 1. The biased single precision exponent will first become the value "0" and then it will become negative (Hex "FF"). In the single precision wrapped format, a biased value of Hex "00" is equal to an unbiased value of −127 and a biased value of wrapped Hex "FF" is equal to an unbiased value of −128. The exponent wrapped around zero and started over from the maximum exponent (Hex "FF"). Also, numbers can become too large to represent and exponent overflow will wrap around the largest exponent (Hex "FF" in single precision) and start over with the smallest exponent (Hex "00"). Associated with that operand is a signal not visible to user which indicates to floating point unit 101 that the number has wrapped. Usually wrapped numbers will only be used internal to floating point unit 101.

The instruction set of master processor 60 allows for many permutations of operand types within a single instruction. A subset of most permutations of mixed precision operands is supported in floating point unit 101 for any single arithmetic instruction as shown in Table 1.

TABLE 1

| First Operand | Second Operand | Result |
|---|---|---|
| SP | SP | SP |
| DP | DP | DP |
| I | I | I |
| U | U | U |
| SP | DP | DP |
| DP | SP | DP |
| SP | SP | SP |

In Table 1: SP means 32 bit single-precision floating point; DP means 64 bit double-precision floating point; I means 32 bit signed integer; and U means 32 bit unsigned integer.

In addition to mixed types in regular operations, conversions between types is useful. Conversion between types is done in floating point arithmetic logic unit 210. Table 2 shows the conversions. These include converting a signed or an unsigned integer to either single or double precision floating point format, converting it back, and converting between the two floating point precisions.

TABLE 2

| Input Format | Output Format |
|---|---|
| SP | SP |
| SP | DP |
| SP | I |
| SP | U |
| DP | SP |
| DP | DP |
| DP | I |
| DP | U |
| I | SP |
| I | DP |
| U | SP |
| U | DP |

Figure 10:
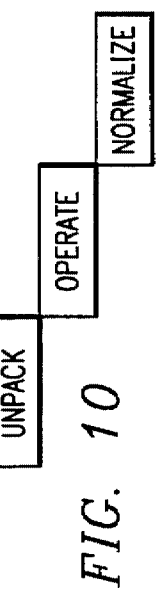
FIG. 10 illustrates the floating point pipeline operation of the master processor.

FIG. 10 shows the basic pipeline for floating point unit 101. The fetch stage is the same as the fetch stage of integer operations previously described. During the unpack stage of a floating point instruction, all data necessary to begin the floating point operation arrives including source operands, opcode, precisions and destination address. The two source operands are read from the register file. Operands are then unpacked into sign, exponent, mantissa fields and the detection of special cases takes place. Input exceptions are detected in this cycle. And input exceptions will be piped through floating point unit 101 and will be signaled on the same cycle as a single precision output exception. The other special cases involving signaling NaN, quiet NaN, infinity, denormal, and zero, are also detected and this information, which is not visible to user, will follow the data through the different pipeline stages of floating point unit 101.

All computation takes place during the operate stage. Depending on the type of instruction, several cycles in the operate stage may be required.

Figure 11:
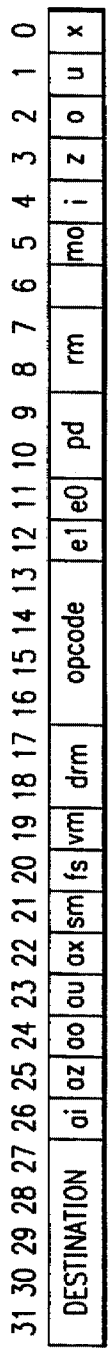
FIG. 11 illustrates the encoding of the floating point status register of the master processor.

Output exceptions are detected in the final normalize stage. When floating point unit 101 result is determined, some of the individual information about this floating point operation is recorded in floating point status register FPST 118 as shown in FIG. 11. In FIG. 11, the Dest field (bits 31–27 form the five-bit destination register address. The ai bit (bit 26) is the accumulated invalid operation flag. The az bit (bit 25) is the accumulated divide by zero flag. The ao bit bit 24) is the accumulated overflow flag. The au bit (bit 23) is the accumulated underflow flag. The ax bit (bit 22) accumulated inexact flag. The sm bit (bit 21) indicates the floating point unit is run in sequential mode where operation stalls waiting for completion of the first floating point operation. The fs bit (bit 20) indicates floating point unit 101 is stalled. The vm bit (bit 19) indicates a vector fast exception mode. The drm field (bits 18–17) is the default rounding mode (if not specified by instruction) as: "00" used to round to nearest integer; "01" used to round to zero; "10" used to round toward positive infinity; and "11" used to round toward negative infinity. The opcode field (bits 16-13) stores the four-bits of the last instruction's opcode. The e1 bit (bit 12) is the tenth most significant bit of an 11-bit exponent. The e0 bit (bit 11) is the ninth most significant bit of an 11-bit exponent. The pd field (bits 10-9) is two-bit destination precision code: "00" single precision floating point; "01" double precision floating point; "10" signed integer; and "11" unsigned integer. The rm field (bits 8-7) it the two-bit rounding mode of the last instruction to write into floating point status register FPST 118. The mo bit (bit 5) is the integer multiply overflow flag. The i bit (bit 4) is the invalid flag. The z bit (bit 3) is the finite number is divided by zero flag. The o bit (bit 2) is the overflow flag. The u bit (bit 1) is the underflow flag. The x bit (bit 0) is the inexact flag. Bits i, z, o, u and x are written at the completion of each individual floating point instruction. The floating point operation is considered to be complete when this status information is written into floating point status register FPST 118. Any floating point instruction writes to floating point status register FPST 118 once and only once.

Figure 12:
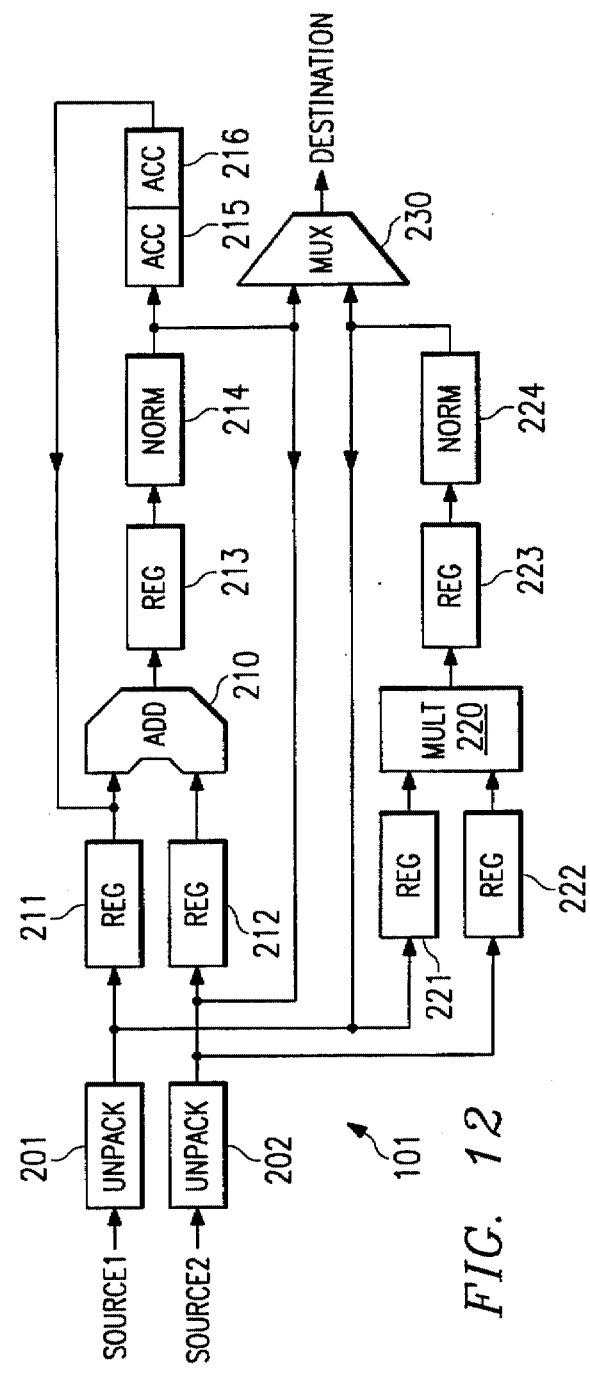
FIG. 12 illustrates the architecture of the floating point unit of the master processor.

FIG. 12 illustrates the construction of floating point unit 101. A pair of unpack units 201 and 202 unpack the received data from the first and second sources. Floating point unit 101 includes two independent units, floating point adder 210 and floating point multiplier 220. The floating point adder 210 unit handles adds, subtracts and conversions. The floating point multiplier 220 unit does all integer multiplies, floating point multiplies, divides, and square roots. The two units are independent in the sense that if floating point multiplier 220 unit is busy, then floating point adder 210 operation can begin. Floating point multiplier 220 unit uses floating point adder 210 unit for special cases such as denormal handling as discussed below. Each has a set of temporary input registers, 211 and 212 for floating point adder 210, and 221 and 222 for floating point multiplier 220. Each has an output register 213 and 214 and a normalization unit 214 and 224. Floating point adder 210 also drives a quadruple word accumulator including registers 215 and 216. Multiplexer 230 selects the signal supplied to the destination.

Figure 13:
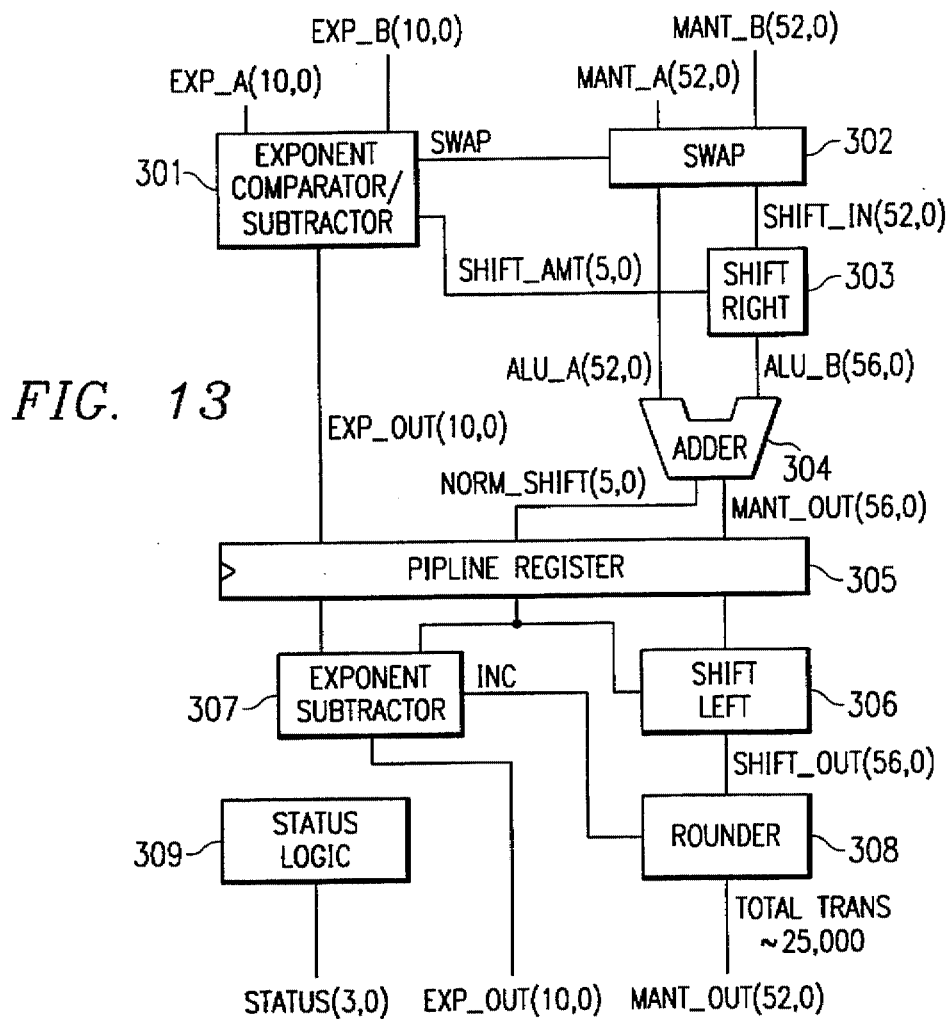
FIG. 13 illustrates the architecture of the floating point arithmetic logic unit of the master processor.

Floating point adder 210 unit is a full 64 bit double precision floating point add unit. Construction of floating point adder unit 210 is illustrated in FIG. 13. This means a double precision operation can be started on every cycle and has the same latency as single precision. The floating point adder 210 unit has the following stages. Exponent comparator/subtractor 301 compares exponents and shift smaller number right to align binary points. Swap unit 302 optionally swaps the first and second operands before supply to adder 304. Shift right unit 303 receives a signal from exponent comparator/subtractor 301 and makes a corresponding right shift in the second operand. Note that swap unit 302 insures that alignment can be achieved by a right shift. The first step in adding or subtracting two binary numbers is to align the mantissa binary points. If exponent comparator/subtractor 301 determines the first operand has the smaller exponent, the two operands are swapped in swap unit 302. The net amount of right shift in the optionally swapped second operand, which now has the smaller exponent, is the absolute difference between the exponents of the first and second operands. The two operands are then fed into standard full adder 304. Full adder 304 predicts the location of the leading 1 in the mantissa which is used in the normalize step.

The IEEE standard 754 requires that all operations be done as if using infinite precision and then rounding to the destination format. To conform to the IEEE standard 754 the shift right unit 303 adds 3 bits to the least significant end of the mantissa. The first two are normal extra bits of precision. The third bit is the logical OR of all the bits shifted off the end of the mantissa during the right shift operation. The results of exponent comparator/subtractor 301 and adder 304 are supplied to pipeline register 305, which temporarily stores these results. This permits the addition operation to be overlapped or pipelined with the normalization operation.

After completion of the add/subtract the mantissa is now 3 bits longer than when it started and the hidden bit may not be a "1". This can happen if the two mantissas were subtracted, or the addition of two numbers with opposite signs. The definition of a normalized number requires the hidden bit to be a "1". The floating point adder 210 unit normalizes the mantissa. Shift left unit 306 left shifts the mantissa until the hidden bit is a "1". The number of shifts required to normalize the mantissa is generated by full adder 304 in the previous stage. If the mantissa is shifted left, then exponent subtractor 307 decrements the exponent reflect the new mantissa by subtracting the shift count from the exponent. This is satisfactory if the exponent does not go below the minimum exponent value, which is a biased value of 1. If the exponent does go below it's minimum value, the number becomes denormalized. The left shift is only allowed until the exponent is 1 or the shift has completed. The number coming out of the shift left unit 306 has now been normalized as much as possible and is ready to be rounded into the destination precision.

The rounder 308 uses the three extended bits of precision along with the mantissa least significant bit, sign, and the rounding mode. The rounding modes are defined by the IEEE standard 754 standard and are selected by the user. The four rounding modes are defined above in conjunction with the description of the floating point status register FPST 118. The round to nearest (half adjust) and the round to zero (truncate) are the most common rounding modes. The directed rounding modes are normally used to control round off error in a known manner. The round to zero mode is simple; the input mantissa is truncated to the destination precision. The round to nearest mode can be stated as being round to nearest, or to even if exactly halfway. In the round to nearest mode, the mantissa is incremented if the following equation is true:

round_up=1st-bit AND (2nd-bit OR 3rd-bit OR lsb)

The status logic 309 of the normalize stage takes all the status information generated by all the blocks in the pipeline stages and generates the output status information required by the IEEE standard 754. Input status is generated by the unpackers. Floating point status register FPST 118 has four status flags defined for the floating point adder 210 unit. These were explained above in conjunction with the description of the floating point status register FPST 118.

The floating point multiplier 220 unit is a 32 bit single precision floating point multiplier with a microcode sequencer to allow it to perform double precision multiplies, and also single and double precision versions of divides and square roots. The floating point multiplier 220 unit handles numbers with normalized mantissas directly, but needs the assistance of the floating point adder 210 unit to handle denormalized numbers. As such, denormalized inputs or outputs impose an execution time penalty.

Since the floating point multiplier 220 has a number of longer instructions, the floating point multiplier 220 unit frequently can not start a new instruction on every cycle. However, these instructions can start on every clock assuming there are no input exceptions: floating point multiply with (1) two signed integer operands and a signed integer output, (2) two unsigned integer operands and an unsigned integer output, and (3) two single precision operands and a single precision output; vector multiply accumulate with two single precision operands and (1) a single precision output, or (2) a double precision output; a vector multiply subtract with two single precision operands and (1) a single precision output, or (2) a double precision output; and vector multiply with single precision operands and a single precision output.

The floating point multiplier 220 unit has the following stages after the execution unit's unpack stage: perform 32 bit integer or single precision floating point multiplication; and normalize and round output value.

Single precision floating point multiplication is performed by adding the two exponents to get the output exponent, and multiplying the two mantissas. At this point, the correct exponent and a nearly normalized mantissa are available. The input mantissas' range are from 1 to 2, so the resulting product's range is from 1 to 4. Thus the floating point multiplier 220 normalization stage is only a one bit shift, as compared to the multi-bit shift in the floating point adder 210 unit.

The next stage of the floating point multiplier 220 unit is devoted to normalizing the mantissa and rounding. During the normalize and rounding stage the mantissa may be greater than 2. If it is, the mantissa is shifted right by one bit and the exponent is incremented. The rounding stage is similar to the floating point adder 210 unit but requires two extra bits of precision: the 1st bit and the 2nd bit. During any multiply the results have more bits than the inputs. A single precision floating point multiply is 24 by 24 resulting in 48 bits. The lower 23 bits are logical ORed together to form the 2nd bit. The upper 25 bits plus the 2nd bit are kept as the mantissa. The rounding follows the same rules as the floating point adder 210 unit. The normalize stage also does the output status generation. Floating point multiplier 220 sets floating point status register FPST 118 status bits as explained above.

The single precision floating point multiplier 220 unit has a 32 by 32 array for use in integer by integer calculations, which makes a double precision multiply an iterative process. To generate a double precision result the double precision inputs are divided into upper and lower halves. Then multiplies are performed and summed as: result= (upper1×upper2)+(upper1×lower2)+(lower1×upper2)+ (lower1×lower2). The four multiplies are needed even though the lower half of the results are discarded after rounding. The exponent path and the normalize stage of the floating point multiplier 220 unit are full double precision widths, so no iterations are needed through these sections.

Figure 14:
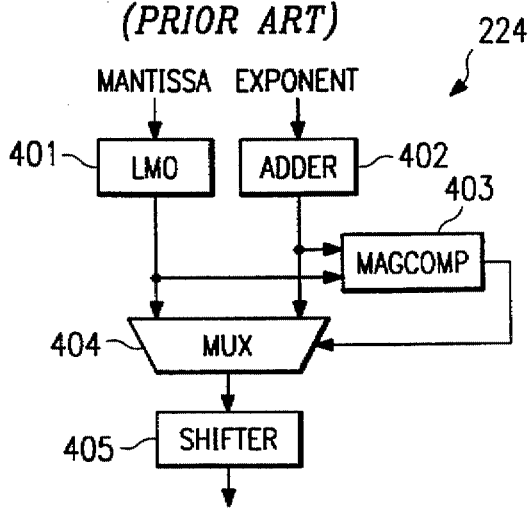
FIG. 14 illustrates an example of a prior art floating point number normalization circuit.
Figure 15:
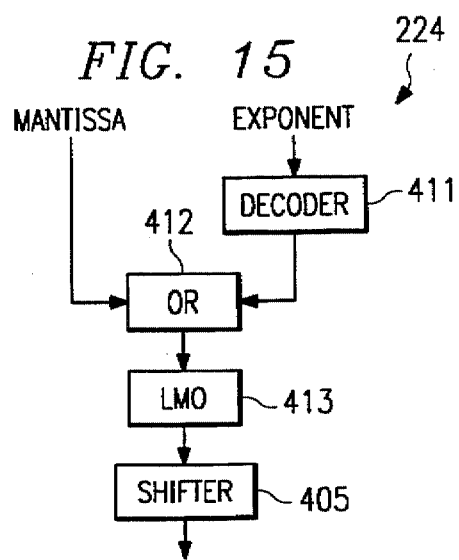
FIG. 15 illustrates an inventive embodiment of a floating point normalization circuit.

FIGS. 14 and 15 illustrate two circuits suitable for normalization units 214 and 224. When using floating point numbers according to the IEEE standard 754 standard, it is required to normalize the mantissa. This requires that the mantissa and exponent both be adjusted so that the mantissa lies in the range between binary "1.000 ... 000" and binary 1.111 ... 111". The mantissa is left shifted by the number of bits that the left most one in the mantissa is away from the required position. In order to maintain the same numerical value of the answer, the exponent is decremented by the shift number.

Following a floating point subtraction, the mantissa may have zeroes in the most significant bits with the first "1" not in the normalized position. For example the subtraction:

$$1.101010111100 * 2^{**}-15 -$$
$$1.101010001000 * 2^{**}-15 =$$
$$0.000000110100 * 2^{**}-15$$

where in the result before normalization, the left most one is 7 bits away from the normalized position. Upon normalization the result is:

$$1.101000000000 * 2^{**}-22$$

with the mantissa left shifted by 7 bits and the exponent decremented by 7.

According to the exponent encoding technique, the exponent has a limited range. It is possible that the decrement required of the exponent would take the exponent below the most negative value allowed. In this case the left shift on the mantissa must be limited to the amount which takes the exponent to the minimum allowed value. This result, which cannot be expressed in a normalized format, is a denormal number. For example, suppose the exponent has a minimum allowable value of −126. Consider the subtraction:

$$1.101010111100 * 2^{**}-123 -$$
$$1.101010001000 * 2^{**}-123 =$$
$$0.000000110100 * 2^{**}-123$$

where in the result before normalization the left most one is 7 bits away. Upon normalization the result is:

$$=1.101000000000 * 2^{**}-130$$

with the mantissa left shifted by 7 bits and the exponent decremented by 7. Note this is an illegal format because the minimum expressible exponent is −126. This result can only be expressed in the denormal form:

$$=0.000110100000 * 2^{**}-126$$

with the mantissa left shifted by 3 bits and the exponent decremented by 3. Any normalization technique must take into account this limitation on the exponent.

A prior art circuit for normalizing a floating point result is illustrated in FIG. 14. The prior art circuit produces 2 values. Left most one detector 401 determines the place of the left most one of the mantissa. This indicates the left shift required to normalize the mantissa, which in this example is 7. Adder 402 determines the maximum left shift allowable from the current exponent. Adder 402 does this by adding 126 to the input exponent. In this example the maximum allowable shift for the current exponent is:

$$126+-123=3$$

Magnitude comparator 403 compares these 2 values to detect the smaller. Magnitude comparator 403 controls multiplexer 404 to select the source (left most one detector 401 or adder 402) having the smaller value. The output of mutiplexer 404 controls the amount of shift provided by shifter 405.

This prior art method is slow due the operation of adder 402. The result from adder 402 is not available until the carry ripple has completed. The time needed for this carry ripple is based upon the number of bits in the exponent. For single precision floating point numbers this is 8 bits. For double precision floating point numbers this is 11 bits. Additionally, the magnitude compare typically also requires a carry ripple of equal length. Because normalization occurs following every floating point operation, this is a critical path. Thus the cycle time of all floating point operations depends on the speed of normalization, which is slowed by the need to wait for two 8 bit or two 11 bit carry ripples.

FIG. 15 illustrates the construction of an improved normalization unit 224. The new circuit removes the need for an adder or a magnitude comparator and so significantly reduces the evaluation time of this circuit. Decoder 411 receives the exponent. Decoder 411 indicates the position the maximum shift based upon the current value of the exponent. This value is then ORed with the mantissa via OR gate 412. Left most one detector 413 detects the left most one in this logical combination. The result from left most one detector 413 is the shift value, which controls the shift amount of shifter 405. Using the previous example:

```
1.101010111100 * 2**-123 −
1.101010001000 * 2**-123 =
0.000000110100 * 2**-123
``` where in the result before normalization the left most one is 7 bits away. The output of decoder 411 is:

$$0.001000000000$$

indicating a maximum shift of 3 bits. The output of OR gate 412 is:

$$0.001000110100$$

which causes left most one detector 413 to output a result of 3. Using this shift amount the final expressed result is:

$$0.000110100000 * 2^{**}-126$$

where the mantissa is shifted by 3 bits and the exponent is decremented by 3.

The longest path of the normalization circuit in FIG. 15 is the same length as the longest path of the prior art normalization circuit in FIG. 14. However, the improved circuit is still faster. This is because the OR function is significantly faster than the magnitude comparator and multiplexer.

Figure 16:
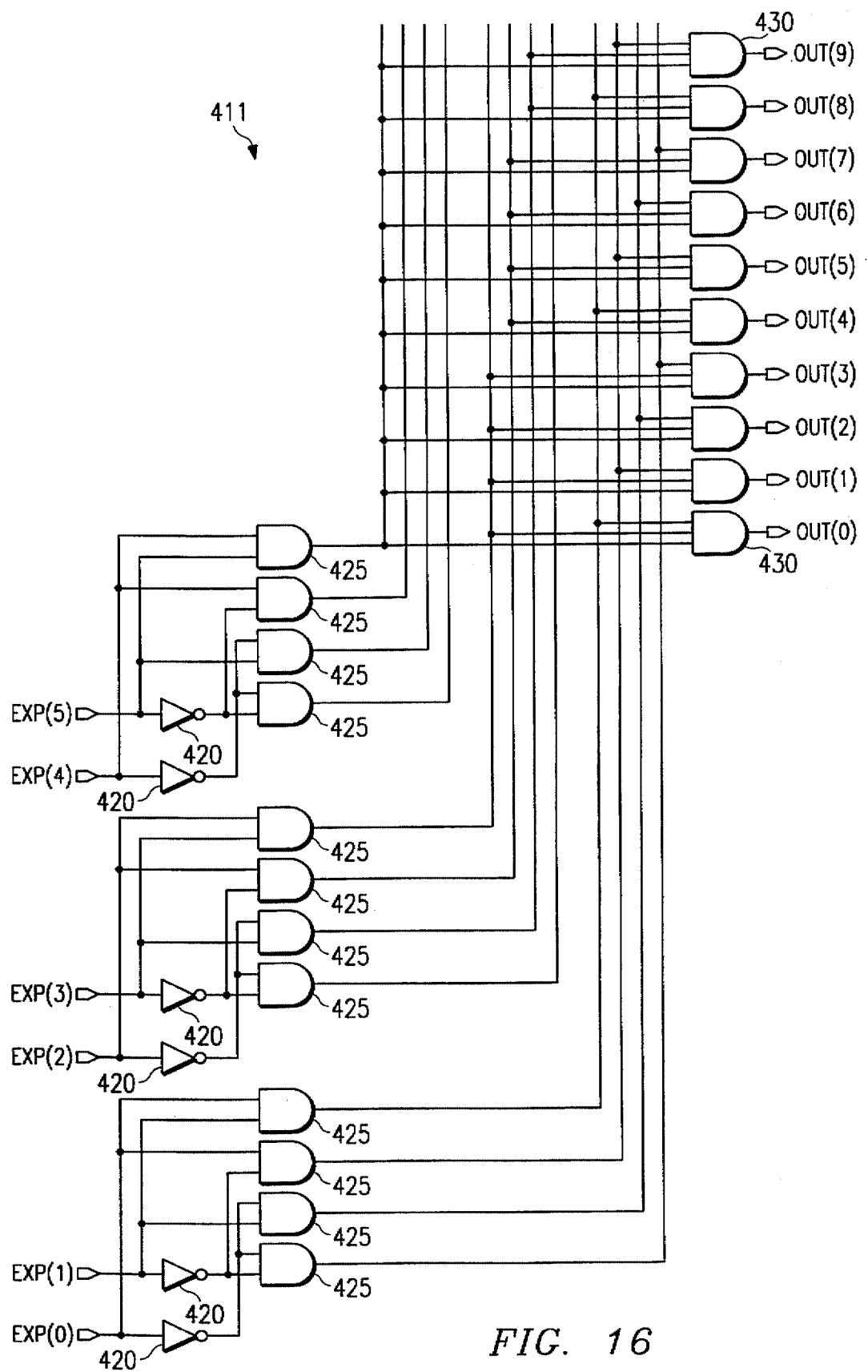
FIG. 16 illustrates the construction of a few exemplary bits of the exponent decode circuit of FIG. 15.

Decoder 411 is constructed as illustrated in FIG. 16. Decoder 411 takes the exponent and produces the smallest mantissa value which can be normalized. This is shown in Table 3.

TABLE 3

| Exponent | Decoder Output | Maximum Shift |
|---|---|---|
| −126 | 1.00000000000000000000000 | 0 |
| −125 | 0.10000000000000000000000 | 1 |
| −124 | 0.01000000000000000000000 | 2 |
| −123 | 0.00100000000000000000000 | 3 |
| −122 | 0.00010000000000000000000 | 4 |
| −121 | 0.00001000000000000000000 | 5 |
| −120 | 0.00000100000000000000000 | 6 |
| −119 | 0.00000010000000000000000 | 7 |
| −118 | 0.00000001000000000000000 | 8 |
| −117 | 0.00000000100000000000000 | 9 |
| −116 | 0.00000000010000000000000 | 10 |
| −115 | 0.00000000001000000000000 | 11 |
| −114 | 0.00000000000100000000000 | 12 |
| −113 | 0.00000000000010000000000 | 13 |
| −112 | 0.00000000000001000000000 | 14 |
| −111 | 0.00000000000000100000000 | 15 |
| −110 | 0.00000000000000010000000 | 16 |
| −109 | 0.00000000000000001000000 | 17 |
| −108 | 0.00000000000000000100000 | 18 |
| −107 | 0.00000000000000000010000 | 19 |
| −106 | 0.00000000000000000001000 | 20 |
| −105 | 0.00000000000000000000100 | 21 |
| −104 | 0.00000000000000000000010 | 22 |
| −103 | 0.00000000000000000000001 | 23 |

Table 3 illustrates all the bits needed for single precision numbers. Since the mantissa is 23 bits, no shift more than 23 bits could be required. Note that double precision numbers where the mantissa is 52 bits and the minimum exponent is 1023 would require a different table. Those skilled in the art would recognize how to construct this table from the principle of Table 3.

This decode can be done with an AND gate for each bit of the mantissa connecting to either the true or false of each bit in the exponent. Such an implementation would be large and slow due to the AND gates with large number of inputs. Each bit line from the exponent must drive 23 gates for single precision and 52 gates for double precision. These would thus be heavily loaded and therefore switch slowly. Each output decode gate would have 6 inputs, and so also switch slowly.

FIG. 16 illustrates a circuit for an exemplary set of bits in an improved decoder using several 2 to 4 line decoders. Each pair of bits of the exponent is coupled to 2 to 4 line decoder consisting of a pair of invertors 420 and four AND gates 425. Each bit of the output would now only require an AND gate 430 with an input from each of the 2 to 4 line decoders. In the new style each AND gate 425 only drives 16 gates, and the AND gates 430 have only 3 inputs. Thus even though there may appear to be an extra level of gating in the critical path, there is no speed penalty. This is because the lines are less heavily loaded and the gates do not have as many inputs. As a consequence the overall delay is reduced.

Master processor 60 includes within in its instruction set some instructions that permit floating point operations to be paired with load or store operations. These operations include: vector floating point add; vector multiply accumulate; vector floating point multiply; vector multiply subtract; vector reverse subtract; vector round floating point input; vector round integer input; and vector floating point subtract. These will be described in detail below.

The encoding of the vector floating point add is shown in FIG. 17. The syntax of this instruction is:

vadd.[sld][sld] Source,Dest,Dest||vector load or store

It may be encoded in register form or long immediate form. The Source1 register (or immediate data) and the destination register are added using the default rounding mode as floating point numbers and the result is put in the destination register. If the 'Dest' field is coded as "00000" (R0) and D is coded as anything else but "1" (double precision) then the result is discarded. A 'Dest' field of "00000" (R0) with D coded as "1" is not supported in the preferred embodiment. A future embodiment may treat this as a write to the floating point accumulator selected by the 'a' bit. A vector load or store can be in the bits marked X.

All double precision floating point numbers are stored in two 32 bit registers. Only even numbered registers are valid locations for double precision floating point numbers. Table 4 shows the legal combinations of precisions:

TABLE 4

| Source1 | Source2 | Dest | Mnemonic |
|---------|---------|------|----------|
| SP | SP | SP | vadd.ss |
| SP | DP | DP | vadd.sd |
| DP | DP | DP | vadd.dd |

The encoding of the vector multiply accumulate instruction is shown in FIG. 18. The syntax of this instruction is:

vmac.ss[x] Source1,Source2,[acc0],Dest || vector load or store

It may be encoded in register accumulator form, register to register form, immediate accumulator form and immediate register form. The single precision Source1 register (or immediate data) is multiplied by the single precision Source2 register with a double precision result. If the 'Z' bit is "0", the result is added (using the default rounding mode) to the contents of the double precision accumulator specified by the 'a' bit. Otherwise the result is added (using the default rounding mode) to a double precision zero. If the 'Z' bit is "0" the accumulator status register selected by the 'a' bit is cleared.

If a vector load or store is coded in the bits marked X, the result of the add is written back to the accumulator, selected by the 'a' bit, as a double precision number. Alternatively, a register destination can be specified in place of a vector load or store. In this case, the result is written to the destination register, with the 'D' bit indicating the precision. It is illegal to have a vector load or store coded in the bits marked X and to have a single precision destination because single precision numbers can not be written to the accumulators.

If the 'Dest' field is coded as "00000" (R0) and D is coded as "1" (double precision) then the destination is written to the floating point accumulator selected by the 'a' bit. If the 'Dest' field is coded as "00000" (R0) and D is coded as anything else but "1" (double precision) then the destination is written to the (R0). The following combinations of precisions are legal:

TABLE 5

| Source1 | Source2 | Dest | Mnemonic | Conditions |
|---------|---------|------|----------|------------|
| SP | SP | SP | vmac.sss | no vld or vst allowed register destination mandatory |
| SP | SP | DP | vmac.ssd | no vld or vst allowed accumulator destination possible |
| SP | SP | DP | vmac.ssd | with vld or vst accumulator destination mandatory |

Note that vld is the mnemonic for vector load and vst is the mnemonic for vector store. These operations will be described below.

The encoding of the vector floating point multiply instruction is shown in FIG. 19. The syntax of this instruction is:

vmpy.[sld][sld] Source,Dest,Dest||vector load or store

It may be encoded in register form or long immediate form. The Source1 register (or immediate data) and the destination register are multiplied as floating point numbers using the default rounding mode and the result is put in the destination register. If the 'Dest' field and the Source1 register are coded as "00000" (R0), then the operation is equivalent to a "vector no operation".

All double precision floating point numbers are stored in two 32 bit registers. Only even numbered registers are valid locations for double precision floating point numbers. The following combinations of precisions shown in Table 6 are legal:

TABLE 6

| Source1 | Source2 | Dest | Mnemonic |
|---------|---------|------|----------|
| SP | SP | SP | vmpy.ss |
| SP | DP | DP | vmpy.sd |
| DP | DP | DP | vmpy.dd |

The encoding of the vector multiply subtract instruction is shown in FIG. 20. The syntax of this instruction is:

vmsc.ss [x] Source1, Source2,[acc0],Dest || vector load or store

It may be encoded in register accumulator form, register to register form, immediate accumulator form and immediate register form. The single precision Source1 register (or immediate data) is multiplied by the single precision Source2 register with a double precision result. If the 'Z' bit is "0", the result is subtracted using the default rounding mode from the contents of the double precision accumulator specified by the 'a' bit. Otherwise the result is subtracted using the default rounding mode from a double precision zero. If the 'Z' bit is "0" the accumulator status register selected by the 'a' bit is cleared. If a vector load or store is coded in the bits marked X, the result of the add is written back to the accumulator, selected by the 'a' bit, as a double precision number. Alternatively, a register destination can be specified in place of a vector load or store. In this case, the result is written to the destination register, with the 'D' bit indicating the precision. It is illegal to have a vector load or store coded in the bits marked X and to have a single precision destination because single precision numbers can not be written to the accumulators. If the 'Dest' field is coded as "00000" (R0) and D is coded as anything else but "1" (double precision) then the result is discarded. A 'Dest' field of "00000" (R0) with D coded as "1" is not supported in the preferred embodiment. A future embodiment may treat this as a write to the floating point accumulator selected by the 'a' bit.

All double precision floating point numbers are stored in two 32 bit registers. Only even numbered registers are valid locations for double precision floating point numbers. The following combinations of precisions shown in Table 7 are legal:

TABLE 7

| Source1 | Source2 | Dest | Mnemonic | Conditions |
|---------|---------|------|----------|------------|
| SP | SP | SP | vmsc.sss | no vld or vst allowed register destination mandatory |
| SP | SP | DP | vmsc.ssd | no vld or vst allowed accumulator destination possible |
| SP | SP | DP | vmsc.ssd | with vld or vst accumulator destination mandatory |

The encoding of the vector reverse subtract instruction is shown in FIG. 21. The syntax of this instruction is:

vmsub.s[skd] Source,[acc0], Dest|| vector load or store

It may be encoded in register or long immediate form. The single precision Source1 register (or immediate data) is multiplied by a single precision 1.0 passed through the multiplier with a double precision result. If the 'Z' bit is "0", the double precision accumulator specified by the 'a' bit is then subtracted from the result using the default rounding mode. Otherwise a double precision zero is subtracted from the result using the default rounding mode. If the 'Z' bit is "0" the accumulator status register selected by the 'a' bit is cleared. If the 'Dest' field is coded as "00000" (R0) and D is coded as "1" (double precision) then the destination is written to the floating point accumulator selected by the 'a' bit. If the 'Dest' field is coded as "00000" (R0) and D is coded as anything else but "1" (double precision) then the destination is written to the (R0).

All double precision floating point numbers are stored in two 32 bit registers. Only even numbered registers are valid locations for double precision floating point numbers. The following combinations of precisions shown in Table 8 are legal:

TABLE 8

| Source1 | Source2 | Dest | Mnemonic |
|---------|---------|------|----------|
| SP | 1.0 | SP | vmsub.ss |
| SP | 1.0 | DP | vmsub.sd |

The encoding of the vector round floating point input instruction is shown in FIG. 22. The syntax of this instruction is:

vrnd.[skd][skdlihu] Source,Dest|| vector load or store

It may be encoded in register form or in long immediate form. The floating point Source1 register is converted using the default rounding mode to the precision specified in the instruction and stored in the destination register. If the 'Dest' field is coded as "00000" (R0) and D is coded as "01" (double precision) then the destination is written to the floating point accumulator selected by the 'a' bit. If the 'Dest' field is coded as "00000" (R0) and D is coded as anything else but "01" (double precision) then the destination is written to the (R0). A vector load or store can be in the bits marked X.

All double precision floating point numbers are stored in two 32 bit registers. Only even numbered registers are valid locations for double precision floating point numbers. The following combinations of precisions shown in Table 9 are legal:

TABLE 9

| Source | Dest | Mnemonic |
|--------|------|----------|
| SP | SP | vrnd.ss |
| DP | SP | vrnd.ds |
| SP | DP | vrnd.sd |
| DP | DP | vrnd.dd |
| SP | I | vrnd.si |
| DP | I | vrnd.di |
| SP | U | vrnd.su |
| DP | U | vrnd.du |

The encoding of the vector round integer input instruction is shown in FIG. 23. The syntax of this instruction is:

vrnd.[ilu][skdlihu] Source,Dest || vector load or store

It may be encoded in register or long immediate form. The Source1 register is converted from integer precision either signed or unsigned to the precision specified in the instruction using the default rounding mode and stored in the destination register. If the 'Dest' field is coded as "00000" (R0) and D is coded as anything else but "1" (double precision) then the result is discarded. A 'Dest' field of "00000" (R0) with D coded as "1" is not supported in the preferred embodiment. A future embodiment may treat this as a write to the floating point accumulator selected by the 'a' bit. A vector load or store can be in the bits marked X.

All double precision floating point numbers are stored in two 32 bit registers. Only even numbered registers are valid locations for double precision floating point numbers. The following combinations of precisions shown in Table 10 are legal:

TABLE 10

| Source | Dest | Mnemonic |
|--------|------|----------|
| I | SP | vrnd.ss |
| U | SP | vrnd.ds |
| I | DP | vrnd.sd |
| U | DP | vrnd.dd |

The encoding of the vector floating point subtract instruction is shown in FIG. 24. The syntax is as follows:

vsub.[skd][skd] Dest,Source,Dest|| vector load or store

Note that the operand order differs from other instructions in order to be consistent with the operation of the instruction. It may be encoded in register form or long immediate form. The Source1 register or immediate data is subtracted using the default rounding mode from the destination register as floating point numbers. The result is put in the destination register. If the 'Dest' field is coded as "00000" (R0) and D is coded as anything else but "1" (double precision) then the result is discarded. A 'Dest' field of "00000" (R0) with D coded as "1" is not supported in the preferred embodiment. A future embodiment may treat this as a write to the floating point accumulator selected by the 'a' bit. A vector load or store can be in the bits marked X.

All double precision floating point numbers are stored in two 32 bit registers. Only even numbered registers are valid locations for double precision floating point numbers. The following combinations of precisions shown in Table 11 are legal:

TABLE 11

| Source1 | Source2 | Dest | Mnemonic |
|---------|---------|------|----------|
| SP      | SP      | SP   | vsub.ss  |
| DP      | SP      | DP   | vsub.ds  |
| DP      | DP      | DP   | vsub.dd  |

Each of the above described vector instructions may be paired within the same instruction with a register load or register store. These are called vector load and vector store, respectively.

The encoding of the vector load instruction is shown in FIG. 25. The syntax of this instruction is:

vector operation|| vld[0|1][.d] Dest

The data at the memory location contained in the INxP control register, which is selected by the 'P' bit of the opcode specified by the vld0 or vld1 mnemonic, is loaded into the destination register. If the data is a 64 bit double word then the data is loaded into a register pair. The least significant part is loaded into the destination register, which must be an even numbered register, and the other word is loaded into the register numerically after the destination register. The selected INxP control register is then incremented by 4 for a 32 bit load or 8 for a 64 bit load.

The encoding of the vector store instruction is shown in FIG. 26. The syntax of this instruction is:

vector operation || vst[.d] Source

The data in the source register is stored at the memory location contained in the OUTP control register. If the data is a 64 bit double word then the data comes from a register pair. The most significant bits of the double word is contained in the source register, which must be an even numbered register, and the least significant bits of the double word is contained in the register numerically after the source register. The OUTP control register is then incremented by 4 for a 32 bit load or 8 for a 64 bit load.

When the vector load (vld) or vector store (vst) instruction is issued without a parallel floating point unit instruction a vector multiply (vmpy) with source and destination registers equal to "00000" (R0) will also be issued. The source and destination precisions will be single precision. The vector multiply instruction will update the floating point status register FPST 118 and write to R0. No input or output exceptions will be generated as a result of this vector multiply instruction.

The vector instructions are implemented to allow a load or a store in parallel with a floating point instruction. The main feature of some of the vector instructions for floating point unit 101 is that the arithmetic logic unit pipeline is added to the end of the multiply pipeline. These instructions are vector multiply accumulate (vmac), vector multiply subtract (vmsc), and vector reverse subtract (vmsub). The only instructions which can have an accumulator destination are: vector multiply accumulate (vmac), vector multiply subtract (vmsc), vector reverse subtract (vmsub), vector round floating point single precision to double precision (vrnd.sd) and vector round floating point double precision to double precision (vrnd.dd).

For the three vector multiply accumulate type instructions which can write to an accumulator and which have a parallel load or store coded in them, an accumulator 215 or 216 destination is mandatory regardless of the register location coded in the opcode and single precision destinations are illegal. When the result of a vector instruction which has a parallel load or store is written to an accumulator, floating point status register FPST 118 will have R0 written into it as the destination register.

The values stored in accumulators 215 and 216 will not be altered because of a hardware or software reset in the preferred embodiment. Therefore it is left to the user to insure that the first time an accumulator 215 or 216 is used after reset with a vector multiply accumulate type instruction that the Z bit of that instruction is set. The automatically adds to zero rather than the target accumulator. Otherwise unpredictable results may occur.

When a vector instruction is used with an accumulator 215 or 216 destination, the preferred embodiment imposes three constraints on operation. The first constraint is that for vector multiply accumulate (vmac), vector multiply subtract (vmsc), and vector reverse subtract (vmsub) the input operands must be single precision. This is done so that no output exceptions will be generated from the multiply operation during the multiply half of the instruction. The multiply that will be executed is a floating point multiply with single precision operands and a double precision output. When the two single precision numbers are multiplied together with a double precision result, the product will never overflow or underflow and the result will always be exact. For accumulator 215 or 216 destinations, the operation in the arithmetic logic unit half of these instructions will always be floating point add or subtract with double precision operands and a double precision output. One input operand to this add/subtract will be the product of the multiply operation. The other input operand will be the result of a similar add/subtract. Thus the result of the add/subtract in the arithmetic logic unit half of these vector instructions should not overflow or underflow. Therefore, there should not be an overflow or underflow condition associated with the floating point numbers that are stored in the accumulators. This helps eliminate input invalid exceptions to arithmetic logic unit 210 during these instructions.

With register file destinations, floating point add or subtract operations with two double precision operands and a single precision output will be allowed as well as floating point add or subtract operations with two double precision operands and a double precision output in the arithmetic logic unit half or the operation. Overflow and underflow can occur with floating point add or subtract operations with two double precision operands and a single precision output. However in the preferred embodiment, since the destination precision is single precision, the result must have a register file destination. Although these operations are not a valid IEEE standard 754 standard mix of precisions they will be allowed in the arithmetic logic unit half of vector multiply accumulate (vmac), vector multiply subtract (vmsc), and vector reverse subtract (vmsub) even though the addition/ subtraction part of these instructions can result in a denormal result.

The second constraint is that for vector multiply accumulate (vmac), vector multiply subtract (vmsc), and vector reverse subtract (vmsub) the input operands should not be ±∞ although the use of ±∞ will not be disallowed. If ∞ is an input operand to floating point multiplier 220, ∞ can be generated for the input to arithmetic logic unit 210. If ∞ is an input to arithmetic logic unit 210, then ∞ can be stored in one of the accumulators 215 or 216. If ∞ is in an accumulator then an invalid exception can be generated at the input of arithmetic logic unit 210 during vector multiply accumulate (vmac), vector multiply subtract (vmsc), and vector reverse subtract (vmsub) instructions. The only invalid operation that can occur at arithmetic logic unit 210 during vmac type instructions is the magnitude subtraction of infinities. If an ∞ is used as an input operand to one of these instructions and an invalid operation occurs at arithmetic logic unit 210, the exception will be signaled when the result of the operation is written to an accumulator or the register file and the invalid trap will be taken. A quiet NaN will be the result. The result will be written to an accumulator for accumulator destinations. Otherwise the result will be written to the destination register file.

Be aware that an invalid operation can occur at the input of floating point multiplier 220 at the same time that an invalid operation occurs at the input of floating point arithmetic logic unit 210 for the vector multiply accumulate type instructions. But, since invalid operations are piped to the output of the appropriate unit, the two invalid operations will not be signaled at the same time. Also the user should be aware that if an invalid operation does occur at the input to floating point arithmetic logic unit 210 during a vector multiply accumulate type instruction and an invalid trap is taken as a result, the trap handler will not have access to the input operands which caused the invalid operation since one of the inputs was from the accumulator. But, since only ∞ can cause invalid in this situation the trap handler could deduce the operand values.

The final constraint affects the vector round floating point operand instruction. The vector round instruction having a double precision operand and a double precision output with an accumulator 215 or 216 destination is intended to be used only for restoring the state of an accumulator. Therefore, if this instruction with an accumulator 215 or 216 destination is used to store any number in an accumulator that did not originate from an accumulator, the user should store either a double precision zero or a number within the double precision range of $2^{253}$>number>$2^{-253}$. If the user does store a number into an accumulator 215 or 216 that did not originate from an accumulator or is outside the given range, excessive invalid, overflow or underflow exceptions may occur. The vector round floating point input instruction can be used to load numbers into the accumulators 215 and 216 which are within the specified range.

The vector multiply accumulate (vmac), vector multiply subtract (vmsc), and vector reverse subtract (vmsub) instructions are implemented to significantly increase the through put of consecutive multiply accumulates. To ensure complete IEEE Standard 754 compatibility without any input constraints for multiply accumulate, the user should multiply with a register file destination and then add/subtract with a register file destination.

The floating point unit 101 pipeline, which is used for those vector instructions that utilize both the arithmetic logic unit pipeline and the multiply pipeline is shown in FIG. 27.

The instructions MPY0 and MPY1 are both vector multiply accumulate type instructions. These instructions include a repeated operate and normalize pair. At time T2 the instruction MPY0 employs floating point multiplier 220 and at time T4 instruction MPY0 employs floating point arithmetic logic unit 210. The instruction ALU2 is a floating point arithmetic logic unit instruction. It would ordinarily be sent to floating point arithmetic logic unit 210 during time T4. However, arithmetic logic unit 210 is busy then busy with the floating point arithmetic logic unit operation of instruction MPY0. Therefore the master processor 60 pipeline stalls this instruction until after time T6 when the two multiply accumulate type instructions MPY0 and MPY1 are finished with floating point arithmetic logic unit 210. Instructions Fetch3 and Fetch4 may be any instruction types. When instruction ALU2 stalls, these instruction also stall.

The instructions vector multiply accumulate (vmac), vector multiply subtract (vmsc), and vector reverse subtract (vmsub) can not produce an output exception in the multiply phase of their vector operation because the input operands are always single precision and the result operand is always double precision. Any single precision number can be exactly represented in the double precision format.

It is possible to generate an input exception at arithmetic logic unit 210 during vector multiply accumulate (vmac), vector multiply subtract (vmsc), and vector reverse subtract (vmsub) instructions when the appropriate values of infinity are stored in the accumulator and generated by floating point multiplier 220. If an input exception is generated at the input of arithmetic logic unit 210 during these three instructions, the exception is piped to the output of the floating point unit 101.

Input exceptions to the vector multiply accumulate (vmac), vector multiply subtract (vmsc), and vector reverse subtract (vmsub) instructions will produce a quiet NaN input to arithmetic logic unit 210. The quiet NaN input to arithmetic logic unit 210 will produce a quiet NaN output from arithmetic logic unit 210 and will be written to the appropriate register or accumulator.

For those vector instructions which utilize both the floating point arithmetic logic unit 210 and floating point multiplier 220 pipelines and have a single precision destination in the register file, a double precision normalized number can be produced which, when rounded to single precision, may fall in the denormal range for single precision numbers. Because the floating point add or subtract instructions with two double precision operands and a single precision output, which are used in floating point arithmetic logic unit 210 half of vector multiply type instructions, are not specified by the IEEE standard 754, the result of these instructions will be forced to zero whenever a double precision normalized result which falls in the denormal range for single precision numbers before rounding is produced. No rounding takes place. The inexact and underflow flags will be signaled. The method for detecting these denormal outputs is as follows. The double precision result of floating point arithmetic logic unit 210 will first be normalized. This could end up with an unbiased exponent value less than −126 before rounding. Therefore the result will be forced to zero and inexact and underflow will be signaled. For those instructions which can write to an accumulator, either the destination register must be "0000" (R0) and the destination precision is double precision or there must be a parallel load or store. Only arithmetic logic unit 210 can write to an accumulator.

The procedures for writing results and exceptions to the register file and floating point status register FPST 118, described in various sections about exceptions, will be followed even though an accumulator is the destination. In other words, even though an accumulator is the real destination of the result, the write to register file location (R0) and to floating point status register FPST 118 will take place at the same time that the accumulator is being written. This implies that if arithmetic logic unit 210 is writing to an accumulator and at the same time the MPY wants to write to the register file, the MPY pipeline will be stalled so that arithmetic logic unit 210 can write to the register file location (R0) and to floating point status register FPST 118. Any enabled traps due to input or output exceptions will be taken at this time.

Any exception generated in any stage of an instruction will be written to floating point status register FPST 118 when the result of the entire instruction is written to an accumulator. The value in an accumulator can only be used as the source2 operand to arithmetic logic unit 210.

The accumulator flags in floating point status register FPST 118 will be used to indicate if a group of instructions had set any status bits. But, since the recommended method for using vmac type instructions may have two or more unrelated strings of vmacs intermixed as shown below.

vmac.ssd R2,R3, 0,a0(R2 X R3)+0→a0
vmac.ssd R4,R5, 0,a1(R4 X R5)+0→a1
vmac.ssd R2,R3,a0,a0(R2 X R3)+a0→a0
vmac.ssd R4,R5,a0,a1(R4 X R5)+a1→a1
vmsc.ssd R2,R3,a0,a0a0-(R2 X R3)→a0
vmac.ssd R4,R5,a0,a1(R4 X R5)+a1→a1
vmac.ssd R2,R3,a0,R6(R2 X R3)+a0→R6
vmsub.ssd R4,a0,R8(R4 X 1.0)−a1→R8

The accumulator flags in floating point status register FPST 118 will indicate the accumulator status of both unrelated strings of vmac instructions. The user will have to separate the two unrelated strings of vmac instructions to look at the accumulator flags for each string of instructions individually.

Figure 28:
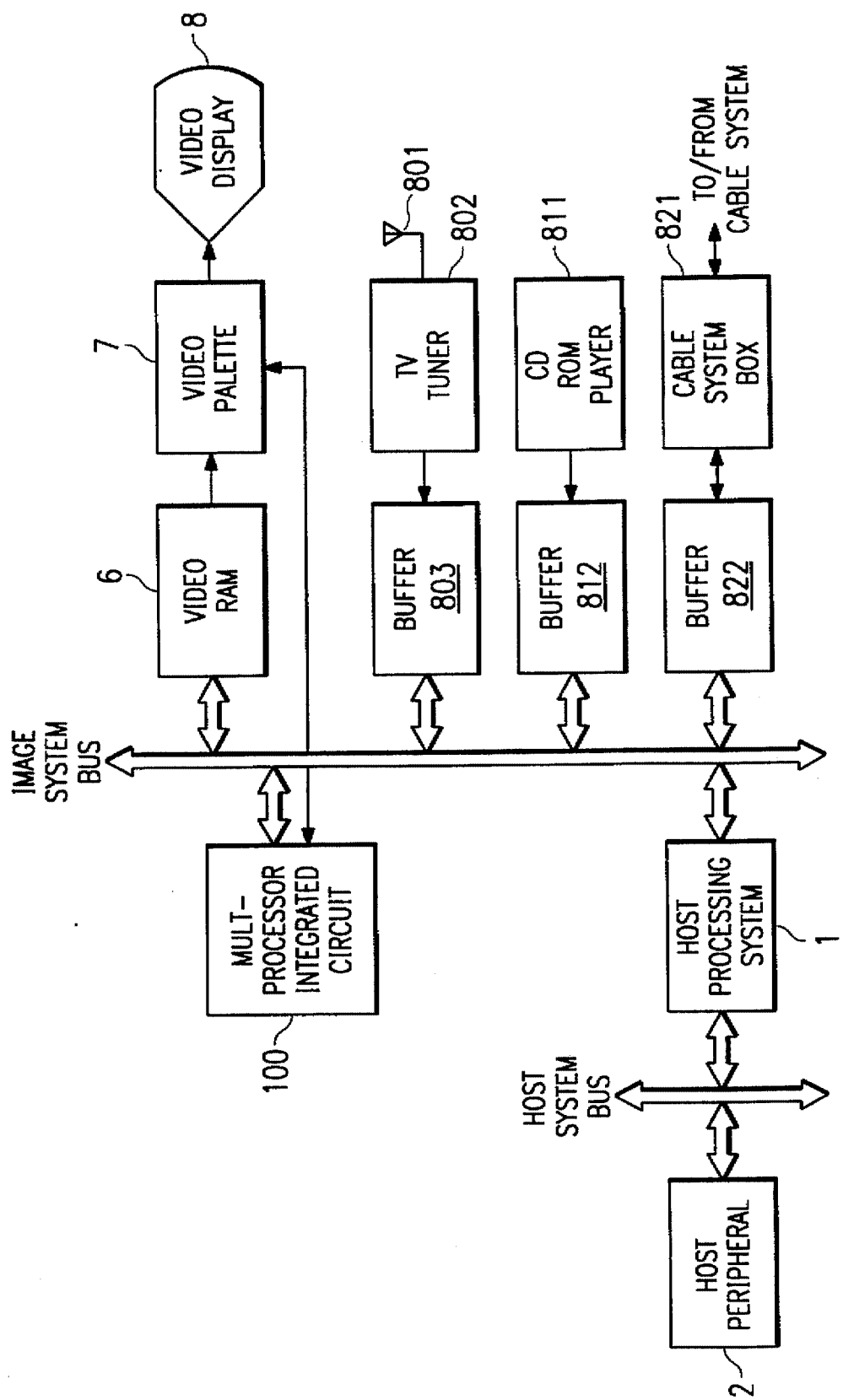
FIG. 28 illustrates an example embodiment of a high definition television system.

FIG. 28 illustrates use of multiprocessor integrated circuit 100 of this invention in a high definition television system. FIG. 28 illustrates three sources of high definition television signals. These are broadcast television signals, compact disk read only memory signals and cable television signals.

Antenna 801 receives broadcast radio frequency signals including high definition television signals. Television tuner 802 includes a tuned receiver which selects a particular radio frequency signal, a demodulator that extracts image data encoded on the radio frequency signal and an analog to digital converter. Television tuner 802 thus generates digital signals corresponding to the high definition television images. These digital signals are temporarily stored in buffer 803, which is also connected to the image system bus.

Compact disk read only memory (CD ROM) player 811 reads data permanently stored on compact disks. These include image data corresponding to the desired high definition television program. Compact disk read only memory player 811 supplies digital data read from the compact disk to buffer 812 for temporary storage. Buffer 812 is also connected to the image system bus.

Cable system box 821 is bidirectionally connected to a cable system. This bidirectional connection permits transmission of high definition television signals to the user from the cable system and transmission of requests, queries and the like from the user to the cable system. The cable system may employ digital transmission to the user or may include radio frequency transmission similar to the radio frequency broadcasts mentioned above. Cable system box 821 includes any needed conversion circuits to supply digital image data to buffer 822 for temporary storage. Note that buffer 822 is also connected to the image system bus.

High definition television will very likely be transmitted in a data compressed format regardless of the mode of transmission. Multiprocessor integrated circuit 100 is programmed to receive the compressed data, decompress this data into individual television frames and supply the frame data to video random access memory 6. As previously described above, this data is recalled from video random access memory 6 and supplied to video palette 7. Video palette 7 generates the proper video signals to drive video display 8. This process of decompressing the image data as supplying it for display includes a lot of data movement both within multiprocessor integrated circuit 100 and along the image system bus. Transfer controller 80 response to requests for packet transfers from master processor 60 and digital image/graphics processors 71, 72, 73 and 74 to control this data movement and coordinate this data movement with other image system bus use such as memory refresh.

FIG. 29 illustrates another system embodiment of this invention. In FIG. 29 multiprocessor integrated circuit 101 includes master processor 60 and a single digital image/graphics processor 71. Multiprocessor integrated circuit 101 requires less silicon substrate area than multiprocessor integrated circuit 100 and consequently can be constructed less expensively. Multiprocessor integrated circuit 101 is constructed using the same techniques as previously noted for construction of multiprocessor integrated circuit 100. Because the width of each digital image/graphics processor matches the width of its corresponding memory and the associated portions of crossbar 50, multiprocessor integrated circuit 100 may be cut between digital image/graphics processors 71 and 72 to obtain the design of multiprocessor integrated circuit 101. Multiprocessor integrated circuit 101 can be employed for applications when the processing capacity of four digital image/graphics processors is not required.

Multiprocessor integrated circuit 101 is illustrated in FIG. 29 as part of a color facsimile apparatus. Modem 1301 is bidirectionally coupled to a telephone line for sending and receiving. Modem 1301 also communicates with buffer 1302, which is further coupled the image system bus. Modem 1301 receives a facsimile signal via the telephone line. Modem 1301 demodulates these signals, which are then temporarily stored in buffer 1302. Transfer controller 80 services buffer 1302 by transferring data to data memories 22, 23 and 24 for processing by digital image/graphics processor 71. In the event that digital image/graphics processor 71 cannot keep ahead of the incoming data, transfer controller 80 may also transfer data from buffer 1302 to memory 9. Digital image/graphics processor 71 processes the image data of the incoming facsimile. This may include image decompression, noise reduction, error correction, color base correction and the like. Once processed, transfer controller 80 transfers image data from data memories 22, 23 and 24 to video random access memory (VRAM) 1303. Printer controller 1304 recalls the image data under control of frame controller 90 and supplies it to color printer 1305, which forms the hard copy.

The apparatus of FIG. 29 can also send a color facsimile. Imaging device 3 scans the source document. Imaging device 3 supplies the raw image data to image capture controller 4 that operates under control of frame controller 90. This image data is stored in video random access memory 1303. Note that the embodiment illustrated in FIG.

29 shares video random access memory 1303 for both image capture and image display in contrast to the embodiment of FIG. 1, which uses separate video random access memories. Transfer controller 80 transfers this image data to data memories 22, 23 and 24. Digital image/graphics processor 71 then processes the image data for image compression, error correction redundancy, color base correction and the like. The processed data is transferred to buffer 1303 by transfer controller 80 as needed to support the facsimile transmission. Depending upon the relative data rates, transfer controller 80 may temporarily store data in memory 9 before transfer to buffer 1302. This image data in buffer 1302 is modulated by modem 1301 and transmitted via the telephone line.

Note that the presence of an imaging device and a color printer in the same system permits this system to also operate as a color copier. In this event data compression and decompression may not be required. However, digital image/graphics processor 71 is still useful for noise reduction and color base correction. It is also feasible for digital image/graphics processor 71 to be programmed to deliberately shift colors so that the copy has different coloring than the original. This technique, known as false coloring, is useful to conform the dynamic range of the data to the dynamic range of the available print colors.

We claim:

1. A data processor comprising:

an integer arithmetic logic unit performing integer and logical operations;

a floating point unit performing floating point operations;

a source of instructions, said source of instructions including at least one vector floating point instruction designating both a memory access and a floating point operation;

at least one control register holding for storing a memory address;

an instruction decode unit connected to said integer arithmetic logic unit, said floating point unit, said source of instructions and said at least one control register and responsive to instructions received from said source of instructions for controlling said operation of said data processing apparatus, said instruction decode unit responsive to a single received vector floating point instruction to perform a memory access employing said memory address stored in a control register designated by said single received vector floating point instruction, increment said address stored in said control register designated by said single received vector floating point instruction to address a next data word; and control said floating point unit to perform a floating point operation designated by said single received vector floating point instruction.

2. The data processor of claim 1, wherein:

said at least one vector floating point instruction of said source of instructions includes a vector floating point add instruction designating a floating point add operation; and said instruction decode unit controls said floating point unit to add two floating point numbers in response to a received vector floating point add instruction.

3. The data processor of claim 2, further comprising:

a plurality of floating point registers;

said vector floating point add instruction includes a source register field designating one of said floating point registers and a destination register field designating one of said floating point registers; and said instruction decode unit controls said floating point unit to add data recalled from said floating point register designated by said source register field to data recalled from said floating point register designated by said destination register field and stores a result in said floating point register designated by said destination register field.

4. The data processor of claim 1, wherein:

said at least one vector floating point instruction of said source of instructions includes a vector floating point subtract instruction designating a floating point subtract operation; and said instruction decoder unit control said floating point unit to subtract two floating point numbers in response to a received vector floating point subtract instruction.

5. The data processor of claim 4, further comprising:

a plurality of floating point registers;

said vector floating point subtract instruction includes a source register field designating one of said floating point registers and a destination register field designating one of said floating point registers; and said instruction decode unit controls said floating point unit to subtract data recalled from said floating point register designated by said source register field from data recalled from said floating point register designated by said destination register field and stores a result in said floating point register designated by said destination register field.

6. The data processor of claim 1, wherein:

said at least one vector floating point instruction of said source of instructions includes a vector floating point multiply instruction designating a floating point multiply operation; and said instruction decode unit controls said floating point unit to multiply two floating point numbers in response to a received vector floating point multiply.

7. The data processor of claim 6, further comprising:

a plurality of floating point registers;

said vector floating point multiply instruction includes a source register field designating one of said floating point registers and a destination register field designating one of said floating point registers; and said instruction decode unit controls said floating point unit to multiply data recalled from said floating point register designated by said source register field by data recalled from said floating point register designated by said destination register field and stores a result in said floating point register designated by said destination register field.

8. The data processor of claim 1, wherein:

said at least one vector floating point instruction of said source of instructions includes a vector floating point multiply and add instruction designating a floating point multiply and add operation; and said instruction decode unit controls said floating point unit to multiply two floating point numbers and add their product to a third floating point number in response to a vector floating point and multiply instruction.

9. The data processor of claim 8, further comprising:

a plurality of floating point registers;

an accumulator;

said vector floating point multiply and add instruction includes a first source register field designating one of said floating point registers and a second source register field designating one of said floating point registers; and said instruction decode unit controls said floating point unit to multiply data recalled from said floating point register designated by said first source register field by data recalled from said floating point register designated by said second source register field, add a multiply result to data in stored in said accumulator and stores an add result in said accumulator.

10. The data processor of claim 1, wherein:

said at least one vector floating point instruction of said source of instructions includes a vector floating point multiply and subtract instruction designating a floating point multiply and subtract operation; and said instruction decode unit
controls said floating point unit to multiply two floating point numbers and subtract their product from a third floating point number in response to a vector floating point and subtract instruction.

11. The data processor of claim 10, further comprising:

a plurality of floating point registers;

an accumulator;

said vector floating point multiply and subtract instruction includes a first source register field designating one of said floating point registers and a second source register field designating one of said floating point registers; and said instruction decode unit controls said floating point unit to multiply data recalled from said floating point register designated by said first source register field by data recalled from said floating point register designated by said second source register field, subtract a multiply result from data stored in said accumulator and stores a subtract result in said accumulator.

12. The data processor of claim 1, wherein:

said at least one vector floating point instruction of said source of instructions includes a vector floating point conversion instruction designating a floating point format conversion operation; and said instruction decode unit
controls said floating point unit to convert a first floating point number from a first format into a second format in response to a vector floating point conversion instruction.

13. The data processor of claim 12, wherein:

said first and second formats are selected from the group consisting of an unsigned integer, a signed integer, a single precision floating point number and a double precision floating number.

14. The data processor of claim 12, further comprising:

a plurality of floating point registers;

said vector floating point add instruction includes a source register field designating one of said floating point registers and a destination register field designating one of said floating point registers; and said instruction decode unit controls said floating point unit to recall data from said floating point register designated by said source register field, convert said recalled data into said second format and stores a result in said floating point register designated by said destination register field.

15. The data processor of claim 1, wherein:

said at least one vector floating point instruction of said source of instructions includes a vector floating point load instruction; and said memory access controlled by said instruction decoder in response to a vector floating point load instruction consists of a memory read recalling data from a memory.

16. The data processor of claim 15, further comprising:

a plurality of floating point registers;

said at least one control register includes at least one input pointer register and an output pointer register;

said vector floating point load instruction includes a destination register field designating one of said floating point registers and an input pointer register field designating one of said at least one input pointer register; and said instruction decode unit controls said memory access to recall data from a memory at an address stored in an input pointer register designated by said input pointer register field and stores said recalled data in said floating point register designated by said destination register field.

17. The data processor of claim 16, wherein:

said at least one input pointer register consists of a first input pointer register and a second input pointer register; and said input pointer register field consists of a single bit, a first state of said single bit designating said first input pointer register and a second state opposite to said first state of said single bit designating said second input pointer register.

18. The data processor of claim 15, further comprising:

said vector floating point load instruction includes a data size field designating a data size to be loaded; and said instruction decode unit controls said memory access to recall data from a memory having a data size corresponding to said data size field.

19. The data processor of claim 18, wherein:

said data size field of said vector floating point load instruction consists of a single bit; and said instruction decode unit controls said memory access to recall data from a memory having a first data size if said single bit has a first state and a second data size if said single bit has a second state opposite to said first state.

20. The data processor of claim 1, wherein:

said at least one vector floating point instruction of said source of instructions includes a vector floating point conversion instruction; and said memory access controlled by said instruction decoder in response to a vector floating point store instruction consists of a memory write storing data into a memory.

21. The data processor of claim 20, further comprising:

a plurality of floating point registers;

said at least one control register includes at least one input pointer register and an output pointer register;

said vector floating point store instruction includes a source register field designating one of said floating point registers; and said instruction decode unit controls said memory access to recall data from said floating point register designated by said source register field and stores said recalled data in a memory at an address stored in said output pointer register.

22. The data processor of claim 20, further comprising:

said vector floating point store instruction includes a data size field designating a data size to be loaded; and said instruction decode unit controls said memory access to store data into a memory having a data size corresponding to said data size field.

23. The data processor of claim 22, wherein:

said data size field of said vector floating point store instruction consists of a single bit; and said instruction decode unit controls said memory access to store data into a memory having a first data size if said single bit has a first state and a second data size if said single bit has a second state opposite to said first state.

24. A data processor comprising:

a floating point unit including
  a floating point multiplier;
  a floating point arithmetic logic unit having an input multiplexed to an output of said floating point multiplier; and
  a pipeline control circuit for said floating point multiplier and said floating point arithmetic logic unit with pipeline stages for unpack, operate and normalize;

memory circuitry;

a source of instructions, said source of instructions including at least one vector floating point instruction designating both a floating point operation and a memory access;

at least one control register holding for storing a memory address; and an instruction register and instruction logic circuitry connected to said floating point multiplier, said floating point arithmetic logic unit, said pipeline control circuit, said source of instructions and said at least one control register and responsive to a single vector floating point instruction received from said source of instructions to operate said floating point unit to perform said floating point operation designated by said single received vector floating point instruction and to perform a memory access employing said memory address stored in a control register designated by said received vector floating point instruction and incrementing said address stored in said control register designated by said single received vector floating point instruction to address a next data word concurrently with said operation of said floating point unit.

25. The data processor of claim 24 wherein said floating point operation designated by said single received vector floating point instruction comprises a floating point add.

26. The data processor of claim 25, further comprising:

a plurality of floating point registers;

said vector floating point instruction includes a source register field designating one of said floating point registers and a destination register field designating one of said floating point registers; and said instruction decode unit controls said floating point arithmetic logic unit to add data recalled from said floating point register designated by said source register field to data recalled from said floating point register designated by said destination register field and stores a result in said floating point register designated by said destination register field.

27. The data processor of claim 24 wherein said floating point operation designated by said single received vector floating point instruction comprises a floating point subtract.

28. The data processor of claim 27, further comprising:

a plurality of floating point registers;

said vector floating point instruction includes a source register field designating one of said floating point registers and a destination register field designating one of said floating point registers; and said instruction decode unit controls said floating point arithmetic logic unit to subtract data recalled from said floating point register designated by said source register field from data recalled from said floating point register designated by said destination register field and stores a result in said floating point register designated by said destination register field.

29. The data processor of claim 24 wherein said floating point operation designated by said single received vector floating point instruction comprises a floating point multiply.

30. The data processor of claim 29, further comprising:

a plurality of floating point registers;

said vector floating point instruction includes a source register field designating one of said floating point registers and a destination register field designating one of said floating point registers; and said instruction decode unit controls said floating point multiply unit to multiply data recalled from said floating point register designated by said source register field by data recalled from said floating point register designated by said destination register field and stores a result in said floating point register designated by said destination register field.

31. The data processor of claim 24 wherein said floating point operation designated by said single received vector floating point instruction comprises floating point multiply and subtract.

32. The data processor of claim 31, further comprising:

a plurality of floating point registers;

an accumulator;

said vector floating point instruction includes a first source register field designating one of said floating point registers and a second source register field designating one of said floating point registers; and said instruction decode unit controls said floating point multiply unit to multiply data recalled from said floating point register designated by said first source register field by data recalled from said floating point register designated by said second source register field, controls said floating point arithmetic logic unit to add a multiply result to data stored in said accumulator and stores an add result in said accumulator.

33. The data processor of claim 24 wherein said floating point operation designated by said single received vector floating point instruction comprises floating point multiply and add.

34. The data processor of claim 33, further comprising:

a plurality of floating point registers;

an accumulator;

said vector floating point instruction includes a first source register field designating one of said floating point registers and a second source register field designating one of said floating point registers; and said instruction decode unit controls said floating point multiply unit to multiply data recalled from said floating point register designated by said first source register field by data recalled from said floating point register designated by said second source register field, control said floating point arithmetic logic unit to subtract a multiply result from data stored in said accumulator and stores a subtract result in said accumulator.

35. The data processor of claim 24 wherein said floating point operation designated by said single received vector floating point instruction comprises a floating point conversion.

36. The data processor of claim 35, further comprising:

a plurality of floating point registers;

said vector floating point instruction includes a source register field designating one of said floating point registers and a destination register field designating one of said floating point registers; and said instruction decode unit controls said floating point unit to recall data from said floating point register designated by said source register field, convert said recalled data into said second format and store a result in said floating point register designated by said destination register field.

37. The data processor of claim 24 wherein said floating point unit further includes plural accumulators for said floating point arithmetic logic unit, and said instruction logic is responsive to an instruction to select one of said accumulators for output from said floating point arithmetic logic unit.

38. The data processor of claim 24, wherein:

said memory access operation controlled by said instruction logic circuitry consists of a memory read recalling data from a memory.

39. The data processor of claim 38, further comprising:

a plurality of floating point registers;

said at least one control register includes at least one input pointer register and an output pointer register;

said vector floating point instruction includes a destination register field designating one of said floating point registers and an input pointer register field designating one of said at least one input pointer register; and said instruction decode unit controls said memory access to recall data from a memory at an address stored in an input pointer register designated by said input pointer register field and stores said recalled data in said floating point register designated by said destination register field.

40. The data processor of claim 39, wherein:

said at least one input pointer register consists of a first input pointer register and a second input pointer register; and said input pointer register field consists of a single bit, a first state of said single bit designating said first input pointer register and a second state opposite to said first state of said single bit designating said second input pointer register.

41. The data processor of claim 38, further comprising:

said vector floating point instruction includes a data size field designating a data size to be loaded; and said instruction decode unit controls said memory access to recall data from a memory having a data size corresponding to said data size field.

42. The data processor of claim 41, wherein:

said data size field of said vector floating point instruction consists of a single bit; and said instruction decode unit controls said memory access to recall data from a memory having a first data size if said single bit has a first state and a second data size if said single bit has a second state opposite to said first state.

43. The data processor of claim 24, wherein:

said memory access operation controlled by said instruction logic circuitry consists of a memory read recalling data from a memory.

44. The data processor of claim 43, further comprising:

a plurality of floating point registers;

said at least one control register includes at least one input pointer register and an output pointer register;

said vector floating point instruction includes a source register field designating one of said floating point registers; and said instruction decode unit controls said memory access to recall data from said floating point register designated by said source register field and stores said recalled data in a memory at an address stored in said output pointer register.

45. The data processor of claim 43, further comprising:

said vector floating point instruction includes a data size field designating a data size to be loaded; and said instruction decode unit controls said memory access to store data into a memory having a data size corresponding to said data size field.

46. The data processor of claim 45, wherein:

said data size field of said vector floating point store instruction consists of a single bit; and said instruction decode unit controls said memory access to store data into a memory having a first data size if said single bit has a first state and a second data size if said single bit has a second state opposite to said first state.

* * * * *